US011070295B2

(12) United States Patent
Funada et al.

(10) Patent No.: US 11,070,295 B2
(45) Date of Patent: Jul. 20, 2021

(54) PON SYSTEM, OPTICAL NETWORK UNIT, OPTICAL LINE TERMINAL, METHOD OF REGISTERING OPTICAL NETWORK UNIT, AND DATA STRUCTURE

(71) Applicant: SUMITOMO ELECTRIC INDUSTRIES, LTD., Osaka (JP)

(72) Inventors: Tomoyuki Funada, Osaka (JP); Daisuke Umeda, Osaka (JP); Keisuke Jinen, Osaka (JP); Naruto Tanaka, Osaka (JP); Daisuke Kawase, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/765,715

(22) PCT Filed: Sep. 25, 2018

(86) PCT No.: PCT/JP2018/035434
§ 371 (c)(1),
(2) Date: May 20, 2020

(87) PCT Pub. No.: WO2019/102706
PCT Pub. Date: May 31, 2019

(65) Prior Publication Data
US 2020/0295845 A1 Sep. 17, 2020

(30) Foreign Application Priority Data

Nov. 22, 2017 (JP) .............................. JP2017-224851
Feb. 16, 2018 (JP) .............................. JP2018-025986

(51) Int. Cl.
*H04B 10/67* (2013.01)
*H04B 10/27* (2013.01)
*H04Q 11/00* (2006.01)

(52) U.S. Cl.
CPC ............. *H04B 10/67* (2013.01); *H04B 10/27* (2013.01); *H04Q 11/0067* (2013.01)

(58) Field of Classification Search
None
See application file for complete search history.

(56) References Cited

U.S. PATENT DOCUMENTS

| | | | |
|---|---|---|---|
| 8,027,473 B2 * | 9/2011 | Stiscia | ................ H04L 63/0428 380/256 |
| 2005/0019036 A1 * | 1/2005 | Soto | .................. H04L 25/03878 398/135 |

(Continued)

FOREIGN PATENT DOCUMENTS

| | | |
|---|---|---|
| JP | 2005-039309 A | 2/2005 |
| JP | 2006-086737 A | 3/2006 |

(Continued)

OTHER PUBLICATIONS

K. P. Jackson, et al., "PR30 Link Budget Considerations from a Component Perspective," [Online], IEEE P802.3ca 100G-EPON Task Force meeting, May 23-25, 2017, [searched on Oct. 2, 2017], the Internet <URL:http://www.ieee802.org/3/ca/public/meeting_archive/2017/05/jackson_3ca_1b_0517.pdf>.

(Continued)

*Primary Examiner* — Darren E Wolf
(74) *Attorney, Agent, or Firm* — Faegre Drinker Biddle & Reath LLP

(57) ABSTRACT

A PON system according to one manner of the present invention includes an optical line terminal (OLT), at least one optical network unit (ONU), and an optical fiber that connects the optical line terminal and the optical network unit to each other. A reception level category for categorizing a reception level in the optical network unit, of an optical signal sent from the optical line terminal through the optical fiber is set. In discovery processing for searching for and (Continued)

registering an unregistered optical network unit, the optical line terminal registers an optical network unit corresponding to the reception level category.

28 Claims, 31 Drawing Sheets

(56) References Cited

U.S. PATENT DOCUMENTS

| | | | |
|---|---|---|---|
| 2005/0265386 A1* | 12/2005 | Smith | H04J 14/0226 370/466 |
| 2006/0060756 A1 | 3/2006 | Nishiyama | |
| 2009/0052894 A1 | 2/2009 | Murata | |
| 2009/0208227 A1* | 8/2009 | Yoshida | H04B 10/2939 398/202 |
| 2010/0221000 A1* | 9/2010 | Yang | H04B 10/272 398/38 |
| 2010/0221007 A1* | 9/2010 | Sakamoto | H04J 14/0232 398/67 |
| 2011/0013904 A1* | 1/2011 | Khermosh | G01M 11/3118 398/16 |
| 2011/0069956 A1* | 3/2011 | Biegert | H04J 14/0247 398/58 |
| 2012/0008937 A1* | 1/2012 | Cheng | H04B 10/272 398/1 |
| 2014/0161453 A1* | 6/2014 | Onaka | H04B 10/2914 398/67 |

FOREIGN PATENT DOCUMENTS

| | | |
|---|---|---|
| JP | 2007-173908 A | 7/2007 |
| JP | 2007-243284 A | 9/2007 |
| JP | 2013-258559 A | 12/2013 |
| JP | 2015-220567 A | 12/2015 |
| JP | 2016-009897 A | 1/2016 |
| JP | 2016-015640 A | 1/2016 |

OTHER PUBLICATIONS

Lee, Hanhyub et al., "SOA pre-amplified upstream signal power in 100G EPON," [Online], IEEE P802.3ca 100G-EPON Task Force, May 22-26, 2017, [searched on Oct. 2, 2017], the Internet <URL:http://www.ieee802.org/3/ca/public/meeting_archive/2017/05/lee_3ca_1_0517.pdf>.

D. Umeda, et al., "SOA Gain Control at OLT," [Online], IEEE P802.3ca 100G-EPON Task Force meeting, Jul. 11-13, 2017, [searched on Oct. 2, 2017], the Internet <URL:http://www.ieee802.org/3/ca/public/meeting_archive/2017/07/umeda_3ca_1_0717.pdf>.

* cited by examiner

FIG.2

| ONU RECEPTION LEVEL CATEGORY (RSSI) | OLT RECEPTION LEVEL CATEGORY (SOA GAIN CONTROL CATEGORY) | | |
|---|---|---|---|
| | 0: OLT LIGHT LEVEL STRONG SOA GAIN LOW | 1: OLT LIGHT LEVEL INTERMEDIATE SOA GAIN INTERMEDIATE | 2: OLT LIGHT LEVEL WEAK SOA GAIN HIGH |
| 0: ONU LIGHT LEVEL WEAK | | | ○ |
| 1: ONU LIGHT LEVEL INTERMEDIATE | | ○ | |
| 2: ONU LIGHT LEVEL STRONG | ○ | | |

FIG.11

| ONU RECEPTION LEVEL CATEGORY | OLT RECEPTION LEVEL CATEGORY (SOA GAIN CONTROL CATEGORY) | | | |
|---|---|---|---|---|
| | 0: OLT LIGHT LEVEL STRONG SOA GAIN LOW | 1: OLT LIGHT LEVEL INTERMEDIATE TO STRONG SOA GAIN INTERMEDIATE TO LOW | 2: OLT LIGHT LEVEL INTERMEDIATE TO WEAK SOA GAIN INTERMEDIATE TO HIGH | 3: OLT LIGHT LEVEL WEAK SOA GAIN HIGH |
| 0: ONU LIGHT LEVEL WEAK | | | | ○ |
| 1: ONU LIGHT LEVEL INTERMEDIATE | | ○ | ○ | |
| 2: ONU LIGHT LEVEL STRONG | ○ | ○ | | |

FIG.17

| ONU RECEPTION LEVEL CATEGORY | OLT RECEPTION LEVEL CATEGORY (SOA GAIN CONTROL CATEGORY) | | | |
|---|---|---|---|---|
| | 0: OLT LIGHT LEVEL STRONG SOA GAIN LOW | 1: OLT LIGHT LEVEL INTERMEDIATE TO STRONG SOA GAIN INTERMEDIATE TO LOW | 2: OLT LIGHT LEVEL INTERMEDIATE TO WEAK SOA GAIN INTERMEDIATE TO HIGH | 3: OLT LIGHT LEVEL WEAK SOA GAIN HIGH |
| 0: ONU LIGHT LEVEL WEAK | | | | ○ |
| 1: ONU LIGHT LEVEL | | | | ○ |
| 2: ONU LIGHT LEVEL | | | | ○ |
| 3: ONU LIGHT LEVEL | | | | ○ |
| 4: ONU LIGHT LEVEL | | | ○ | ○ |
| 5: ONU LIGHT LEVEL | | ○ | ○ | |
| 6: ONU LIGHT LEVEL | ○ | | | |
| 7: ONU LIGHT LEVEL STRONG | ○ | | | |

|  | FIRST CATEGORY | SECOND CATEGORY | THIRD CATEGORY | RECEPTION LEVEL CATEGORY |
|---|---|---|---|---|
| ONU RECEPTION LEVEL | Yes | No | No | FIRST CATEGORY |
|  | Yes | Yes | No | FIRST CATEGORY |
|  | No | Yes | No | SECOND CATEGORY |
|  | No | Yes | Yes | SECOND CATEGORY |
|  | No | No | Yes | THIRD CATEGORY |

PON SYSTEM, OPTICAL NETWORK UNIT, OPTICAL LINE TERMINAL, METHOD OF REGISTERING OPTICAL NETWORK UNIT, AND DATA STRUCTURE

TECHNICAL FIELD

The present invention relates to a PON system, an optical network unit, an optical line terminal, a method of registering an optical network unit, and a data structure. The present application claims priority to Japanese Patent Application No. 2017-224851 filed on Nov. 22, 2017 and Japanese Patent Application No. 2018-025986 filed on Feb. 16, 2018, contents of which are incorporated by reference herein in their entirety.

BACKGROUND ART

A passive optical network (PON) is a system for point-to-multipoint optical communication between an optical line terminal (OLT) and at least one optical network unit (ONU). The optical line terminal is a unit generally arranged on the premises of a service provider and also called an "OLT". The optical network unit is a unit arranged on the premises of a subscriber or in the vicinity thereof and also called an "ONU".

A reception circuit of an OLT detects a level of a received signal and carries out gain control based on the detected level. For example, Japanese Patent Laying-Open No. 2006-86737 (PTL 1) discloses a bias control circuit that controls a direct-current voltage applied to an avalanche photodiode (APD). The bias control circuit detects a photocurrent generated by the APD and controls a voltage source in accordance with the detected current.

Intensity of a burst signal input to an optical amplifier of an optical line terminal is varied depending on a distance from a subscriber to an optical splitter or individual variation in output from a transmitter within an ONU. Japanese Patent Laying-Open No. 2005-39309 (PTL 2) discloses a configuration for setting a bias voltage of an APD. A parent station (OLT) measures in advance a level of reception of an upstream optical signal for each child station (ONU) and stores the reception level. The parent station sets a bias voltage of the APD based on the stored reception intensity immediately before reception of an upstream optical signal from a specific child station.

Japanese Patent Laying-Open No. 2016-9897 (PTL 3) and Japanese Patent Laying-Open No. 2016-15640 (PTL 4) propose a configuration for controlling a gain of an optical amplifier. A burst signal is branched into signal light and monitor light by a photocoupler and a level of monitor light is detected. An optical fiber for delay is introduced in a transmission path for signal light. A gain of the optical amplifier can thus be controlled as being timed to reception of signal light.

In a 100 Gbps-class PON (for example, a 100G-EPON), a fiber line the same as in 10G-EPON is used to transmit four optical signals that are different in wavelength from one another and each have a transmission capacity of 25.78125 Gb/s (which is denoted as "25 Gbps" below). Transmission loss in the fiber line is 15 dB at the minimum and 29 dB at the maximum. One hundred G-EPON is approximately 2.5 times as high in transmission rate as 10G-EPON. As a transmission rate is higher, a light receiver broader in band is required for an OLT. Consequently, 100G-EPON is estimated to be lower than 10G-EPON in reception sensitivity of an OLT-side receiver by approximately 4 to 5 dB. A higher transmission rate causes deterioration in quality of a waveform of a transmission signal and increase in penalty due to fiber wavelength dispersion.

In 100G-EPON, an optical multiplexer/demultiplexer for multiplexing/demultiplexing four waves is employed. Therefore, insertion loss of each of the optical multiplexer and the optical demultiplexer (approximately 1.5 dB) should be taken into account in reception of an optical signal in an optical line terminal.

Error correction may be introduced as measures against deterioration of reception sensitivity of an OLT. An error correction function to lower a bit error ratio (BER) approximately from $10^{-3}$ to $10^{-12}$ has already been introduced in 10G-EPON. Therefore, even though a correction code high in error correction capability is further introduced, deterioration of reception sensitivity is not readily compensated for.

Transmission power of an ONU may be raised in order to compensate for deterioration of reception sensitivity on the OLT side. Possibility of increase in cost for the ONU due to increase in transmission power of the ONU, however, should be taken into account. Since a plurality of ONUs 200 are connected to an optical distribution network in a PON system, increase in cost for each ONU greatly affects cost for the entire PON system. From such a point of view, application of a semiconductor optical amplifier (SOA) to reception in an OLT has been studied (K. P. Jackson, et al., "PR30 Link Budget Considerations from a Component Perspective," [Online], IEEE P802.3ca 100G-EPON Task Force meeting, May 23 to 25, 2017, [searched on Oct. 2, 2017], the Internet <URL:http://www.ieee802.org/3/ca/public/meeting_archive/2017/05/jackson_3ca_1b_0517.pdf> (NPL 1)). By applying an optical amplifier to an OLT, significant increase in cost for an ONU may be suppressed while reception sensitivity on the OLT side is improved.

In a PON, a distance from an OLT and the number of branches of a fiber are different for each ONU and hence transmission loss in a fiber line is different for each ONU. An OLT may receive a relatively strong optical signal from one ONU while it may receive a relatively weak optical signal from another ONU. Possibility that a maximum reception level of a light reception device of an OLT exceeds a damage threshold of that device (that is, failure of the light reception device) when transmission power of an ONU is raised or when an SOA is applied to reception in the OLT has been pointed out (Hanhyub Lee, et al., "SOA pre-amplified upstream signal power in 100G EPON," [Online], IEEE P802.3ca 100G-EPON Task Force, May 22 to 26, 2017, [searched on Oct. 2, 2017], the Internet <URL:http://www.ieee802.org/3/ca/public/meeting_archive/2017/05/lee_3ca_1_0517.pdf (NPL 2)).

As means for solving this problem, control of a gain of an SOA for each burst signal in reception in an OLT by using an SOA preamplifier has been proposed. For example, when an OLT receives a strong optical signal, the OLT lowers a gain of the SOA (D. Umeda, et al., "SOA Gain Control at OLT," [Online], IEEE P802.3ca 100G-EPON Task Force meeting, Jul. 11 to 13, 2017, [searched on Oct. 2, 2017], the Internet <URL:http://www.ieee802.org/3/ca/public/meeting_archive/2017/07/umeda_3ca_1_0717.pdf> (NPL 3)).

In order to control an SOA gain, a reception level of an OLT should be detected or estimated. When the gain of an SOA is controlled after detection of a reception level of the OLT, control of the gain of the SOA (change from a high gain to a low gain) may not be in time. A reception device not sufficiently resistant to strong optical input may fail before completion of control of the gain of the SOA. In addition, it is technically difficult to quickly detect a level of reception of a burst signal.

Under a scheme for branching an optical signal as disclosed in PTL 3 or PTL 4, intensity of the optical signal is lowered. Since a configuration for branching an optical signal is required, the scheme is disadvantageous in cost and implementation.

Until processing for discovering an unregistered ONU ("discovery"), an OLT is unable to hold information on that ONU. Therefore, the OLT is unable to obtain information required for reception processing. For example, Japanese Patent Laying-Open No. 2007-243284 (PTL 5) discloses a PON system capable of solving such a problem. In the PON system, communication at a plurality of types of transmission rates is established. A terminal unregistered in the PON system makes a discovery response at one type of transmission rate within a discovery period.

CITATION LIST

Patent Literature

PTL 1: Japanese Patent Laying-Open No. 2006-86737
PTL 2: Japanese Patent Laying-Open No. 2005-39309
PTL 3: Japanese Patent Laying-Open No. 2016-9897
PTL 4: Japanese Patent Laying-Open No. 2016-15640
PTL 5: Japanese Patent Laying-Open No. 2007-243284

Non Patent Literature

NPL 1: K. P. Jackson, et al., "PR30 Link Budget Considerations from a Component Perspective," [Online], IEEE P802.3ca 100G-EPON Task Force meeting, May 23 to 25, 2017, [searched on Oct. 2, 2017], the Internet <URL: http://www.ieee802.org/3/ca/public/meeting_archive/2017/05/jackson_3ca_1b_0517.pdf>
NPL 2: Hanhyub Lee, et al., "SOA pre-amplified upstream signal power in 100G EPON," [Online], IEEE P802.3ca 100G-EPON Task Force, May 22 to 26, 2017, [searched on Oct. 2, 2017], the Internet <URL:http://www.ieee802.org/3/ca/public/meeting_archive/2017/05/lee_3ca_1_0517.pdf
NPL 3: D. Umeda, et al., "SOA Gain Control at OLT," [Online], IEEE P802.3ca 100G-EPON Task Force meeting, Jul. 11 to 13, 2017, [searched on Oct. 2, 2017], the Internet <URL:http://www.ieee802.org/3/ca/public/meeting_archive/2017/07/umeda3ca_1_0717.pdf>

SUMMARY OF INVENTION

A PON system according to one manner of the present invention includes an optical line terminal, at least one optical network unit, and an optical fiber that connects the optical line terminal and the optical network unit to each other. A reception level category is set for categorizing a reception level at the optical network unit, of an optical signal sent from the optical line terminal through the optical fiber. In discovery processing for searching for and registering an unregistered optical network unit, the optical line terminal registers an optical network unit corresponding to the reception level category.

A PON system according to one manner of the present invention includes an optical line terminal, at least one optical network unit, and an optical fiber that connects the optical line terminal and the optical network unit to each other. The optical line terminal includes an amplifier that amplifies an optical signal received from the optical network unit with a variable gain, and determines and registers a category of the gain in discovery processing. In the discovery processing, the optical line terminal sets a gain category of the gain of the amplifier in an ascending order of the gain. An unregistered optical network unit attempts to respond to the discovery processing in the ascending order of the gain of the amplifier. When response from the unregistered optical network unit has been acknowledged, the optical line terminal sets the gain category for the unregistered optical network unit.

An optical network unit according to one manner of the present invention includes a receiver that receives an optical signal, a registration unit that registers a reception level category in connection with a level of reception of the optical signal in the receiver, and a transmitter that transmits, when a reception level category designated in discovery processing for searching for and registering an unregistered optical network unit corresponds to the level of reception registered in the registration unit, response to the discovery processing in a form of an optical signal.

An optical line terminal according to one manner of the present invention includes a receiver that receives an optical signal, an amplifier provided in a stage preceding the receiver, the amplifier amplifying the optical signal with a variable gain, and a transmitter that transmits an optical signal for discovery processing for searching for and registering an unregistered optical network unit. For check against a reception level category of the optical network unit, a reception level category associated with the gain of the amplifier is designated in the discovery processing. The optical line terminal further includes a registration unit that registers an optical network unit that has responded to the discovery processing.

A method of registering an optical network unit according to one manner of the present invention is a method of registering an optical network unit in a PON system in which an optical line terminal and at least one optical network unit are connected to each other through an optical fiber. The method includes setting in the optical network unit, a reception level category for categorizing a reception level at the optical network unit, of an optical signal sent from the optical line terminal through the optical fiber, performing, by the optical line terminal, discovery processing for designating a reception level and searching for and registering an unregistered optical network unit, responding, by the unregistered optical network unit, to the discovery processing when the reception level designated by the optical line terminal corresponds to the reception level category set in the unregistered optical network unit, and registering, by the optical line terminal, an optical network unit that has responded to the discovery processing.

A data structure according to one manner of the present invention is a data structure used for discovery processing in a PON system for causing an optical line terminal to recognize an unregistered optical network unit. The discovery processing includes searching, by the optical line terminal, for an optical network unit having a reception level category designated by the optical line terminal. The data structure includes a reception level category for notification from the optical line terminal to the optical network unit.

BRIEF DESCRIPTION OF DRAWINGS

FIG. 2 is a diagram for illustrating relation between an ONU reception level category and an OLT reception level category according to the first embodiment.

FIG. 11 is a diagram schematically showing one example of mapping information applicable to a third embodiment.

FIG. 17 is a diagram showing another example of mapping information according to the third embodiment.

DETAILED DESCRIPTION

Figure 1:
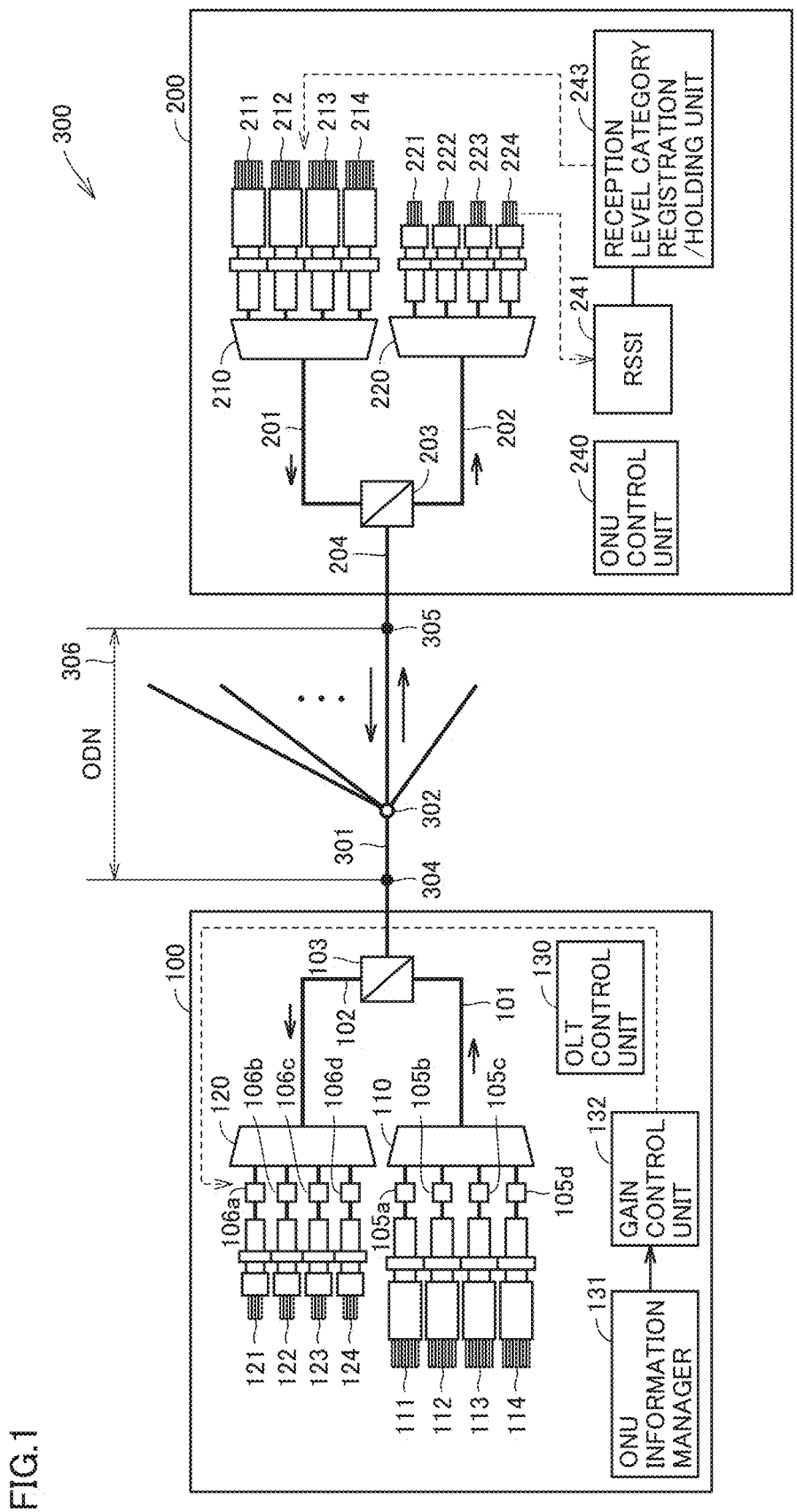
FIG. 1 is a diagram showing an exemplary configuration of an optical communication system according to a first embodiment.

Problem to be Solved by the Present Disclosure

Before registration of an ONU, an OLT is unable to hold information on a reception level of that ONU. Therefore, the OLT is unable to guarantee gain control in reception of an optical signal from that ONU. None of the literatures above has proposed a solution to such a problem.

An object of the present disclosure is to provide an apparatus and a method for allowing registration of an unregistered ONU while guaranteeing gain control in reception of an optical signal from that ONU.

Advantageous Effect of the Present Disclosure

According to the present disclosure, an unregistered ONU can be registered while gain control in reception of an optical signal from that ONU is guaranteed.

Description of Embodiments of the Present Invention

Embodiments of the present invention will initially be listed and described.

(1) A PON system according to one manner of the present invention includes an optical line terminal, at least one optical network unit, and an optical fiber that connects the optical line terminal and the optical network unit to each other. A reception level category is set for categorizing a reception level at the optical network unit, of an optical signal sent from the optical line terminal through the optical fiber. In discovery processing for searching for and registering an unregistered optical network unit, the optical line terminal registers an optical network unit corresponding to the reception level category.

A length of an optical fiber that connects an optical line terminal and an optical network unit to each other may be different for each optical network unit. Since a length of an optical fiber may be different owing to transmission loss of the optical fiber depending on a distance from an optical line terminal to an optical network unit, a level of reception at the optical line terminal, of an optical signal from each optical network unit may be different. The optical line terminal sets a reception level category and then registers an optical network unit corresponding to the reception level. In discovery processing, a signal having appropriate intensity is input from the optical network unit to the optical line terminal. Therefore, while gain control in reception of an optical signal from an unregistered optical network unit is guaranteed, that optical network unit can be registered in discovery processing.

(2) Preferably, the optical line terminal designates the reception level category in the discovery processing. When the unregistered optical network unit determines the reception level category based on the reception level and when the reception level designated by the optical line terminal corresponds to the determined reception level category, the unregistered optical network unit responds to the optical line terminal.

According to the above, while gain control in reception of an optical signal from an unregistered optical network unit is guaranteed, that optical network unit can be registered in discovery processing.

(3) Preferably, the optical line terminal includes an amplifier that amplifies the optical signal received from the optical network unit with a variable gain and designates the reception level category in the discovery processing. The reception level category is associated with the gain of the amplifier. The unregistered optical network unit attempts to respond to the discovery processing in an ascending order of the gain of the amplifier, and the reception level category designated in the discovery processing under which response is successful is set as the reception level category of the unregistered optical network unit.

According to the above, an attempt to respond to a discovery notification is made in the ascending order of the gain of the amplifier. Therefore, possibility of damage to a receiver in the optical line terminal by an optical signal from the optical network unit can be lowered.

(4) Preferably, the optical line terminal determines the reception level category. The optical line terminal includes an amplifier that amplifies the optical signal received from the optical network unit with a variable gain. The reception level category is brought in correspondence with one gain level category or a plurality of gain level categories of the gain. When the plurality of gain level categories are allocated to a single reception level category, the unregistered optical network unit attempts to respond to the discovery processing in an ascending order of the plurality of gain level categories.

According to the above, since a plurality of gain level categories are brought in correspondence with a single reception level category on a side of the optical network unit, a more suitable gain level category can be brought in correspondence with the reception level category on the side of each optical network unit. Gain control in reception of an optical signal from an unregistered optical network unit can thus more reliably be guaranteed.

(5) Preferably, the optical line terminal transmits the reception level category determined by the optical line terminal to the optical network unit.

According to the above, an optimal reception level category can be set in accordance with a characteristic of the amplifier in the optical line terminal. For example, gain control in consideration of individual variation in characteristic of the amplifier can be achieved.

(6) Preferably, when the unregistered optical network unit has responded to the discovery processing, the optical line terminal determines whether or not the unregistered optical network unit can be registered.

According to the above, the optical line terminal can more accurately determine whether or not to register an optical network unit.

(7) Preferably, determination by the optical line terminal includes comparison of a frequency of correction in error correction processing with a threshold value.

According to the above, the optical line terminal can determine whether or not to register an optical network unit based on a frequency of correction in error correction processing.

(8) Preferably, the reception level category is set based on reception power of the optical network unit.

According to the above, the optical line terminal can directly know the reception level of the optical network unit based on reception power of the optical network unit.

(9) Preferably, the reception level category is set based on line loss of the optical fiber that corresponds to a difference between transmission power of the optical line terminal and reception power of the optical network unit.

According to the above, the optical line terminal can estimate the reception level of the optical network unit from line loss of the optical fiber.

(10) Preferably, the reception level category is set based on a maximum value of the reception level of the optical network unit and a minimum value of the reception level of the optical network unit.

According to the above, the reception level category can be set based on a range of the reception level.

(11) Preferably, when the optical line terminal performs the discovery processing, the optical line terminal incorporates the maximum value and the minimum value into a discovery gate message.

According to the above, the optical line terminal can notify the optical network unit of the reception level category through a discovery gate message.

(12) Preferably, at least one of the maximum value and the minimum value is variable.

According to the above, a range of the reception level for one reception level category can arbitrarily be set.

(13) Preferably, the optical line terminal changes the reception level category from a first category to a second category overlapping in range with the first category. When the reception level of the optical network unit is included in both of the first category and the second category, the optical network unit responds to the optical line terminal at the time when the reception level category higher in reception level, of the first category and the second category, is set.

According to the above, possibility that the optical network unit is not registered when there is an error in reception level or the reception level is varied in the optical network unit can be lowered.

(14) Preferably, the optical network unit measures the reception level of the optical network unit and determines whether or not the reception level corresponds to the reception level category based on a measured value of the reception level.

According to the above, the optical line terminal can register an optical network unit corresponding to the reception level category.

(15) The reception level category is set based on line loss of the optical fiber that corresponds to a difference between transmission power of the optical line terminal and reception power of the optical network unit.

According to the above, the optical line terminal can register an optical network unit corresponding to the reception level category.

(16) The optical line terminal sets a plurality of times, a set of the maximum value and the minimum value. A plurality of sets of the maximum value and the minimum value include a first set and a second set that satisfy relation that the maximum value of the second set is larger than the minimum value of the first set. The optical line terminal performs the discovery processing for the plurality of sets in a descending order of the maximum value.

According to the above, possibility that the optical network unit is not registered when there is an error in reception level or the reception level is varied in the optical network unit can be lowered.

(17) A PON system according to one manner of the present invention includes an optical line terminal, at least one optical network unit, and an optical fiber that connects the optical line terminal and the optical network unit to each other. The optical line terminal includes an amplifier that amplifies an optical signal received from the optical network unit with a variable gain, and determines and registers a category of the gain in discovery processing. In the discovery processing, the optical line terminal sets a gain category of the gain of the amplifier in an ascending order of the gain. An unregistered optical network unit attempts to respond to the discovery processing in the ascending order of the gain of the amplifier. When response from the unregistered optical network unit has been acknowledged, the optical line terminal sets the gain category for the unregistered optical network unit.

According to the above, an unregistered optical network unit attempts to respond to discovery processing in the ascending order of the gain of the amplifier. When an optical signal sent from the optical network unit is high in intensity, the optical line terminal can amplify the optical signal with a low gain. Therefore, the optical line terminal can receive an optical signal having appropriate intensity. While gain control in reception of an optical signal from an unregistered optical network unit is guaranteed, that optical network unit can be registered in discovery processing.

(18) The optical line terminal repeatedly makes setting of the gain of the amplifier in the discovery processing and sets the gain category for the optical network unit from which the response has been acknowledged at a gain lower than the registered gain category.

According to the above, an appropriate gain in accordance with intensity of an optical signal from an optical network unit can be set.

(19) The optical line terminal includes a light receiver that receives an optical signal amplified by the amplifier. When intensity of the optical signal input to the light receiver is higher than a threshold value, the optical line terminal selects the gain category lowest in gain and sets again the gain category in an ascending order of the gain.

According to the above, possibility of damage to a light receiver can be lowered.

(20) The optical network unit monitors the reception level of the optical network unit, and when the reception level exceeds a threshold value, the optical network unit stops optical output. The optical line terminal determines that the optical network unit is in an abnormal condition based on stop of the optical output from the optical network unit, disconnects a logical link of the optical network unit to the PON system, and registers again the optical network unit by performing the discovery processing.

According to the above, when intensity of an optical signal from an optical network unit becomes higher for some reason, an appropriate gain can be set.

(21) The optical line terminal includes a light receiver that receives an optical signal from the optical network unit and varies an amplification factor in accordance with a voltage applied thereto. The optical line terminal varies the voltage applied to the light receiver in accordance with the reception level category.

According to the above, an amplification factor for an optical signal can be varied in the optical line terminal by varying a voltage applied to the light receiver.

(22) An optical network unit according to one manner of the present invention includes a receiver that receives an optical signal, a registration unit that registers a reception level category in connection with a level of reception of the optical signal in the receiver, and a transmitter that transmits, when a reception level category designated in discovery processing for searching for and registering an unregistered optical network unit corresponds to the level of reception registered in the registration unit, response to the discovery processing in a form of an optical signal.

According to the above, when a reception level category of an optical network unit corresponds to the reception level category designated in discovery processing, the optical network unit responds to that discovery processing. Therefore, the optical network unit can be managed based on the reception level category.

(23) An optical line terminal according to one manner of the present invention includes a receiver that receives an optical signal, an amplifier provided in a stage preceding the receiver, the amplifier amplifying the optical signal with a variable gain, and a transmitter that transmits an optical signal for discovery processing for searching for and registering an unregistered optical network unit. For check against a reception level category of the optical network unit, a reception level category associated with the gain of the amplifier is designated in the discovery processing. The optical line terminal further includes a registration unit that registers an optical network unit that has responded to the discovery processing.

According to the above, the optical line terminal registers an optical network unit having a reception level category corresponding to the designated reception level category. Therefore, the optical network unit can be managed based on the reception level category.

(24) A method of registering an optical network unit according to one manner of the present invention is a method of registering an optical network unit in a PON system in which an optical line terminal and at least one optical network unit are connected to each other through an optical fiber. The method includes setting in the optical network unit, a reception level category for categorizing a reception level at the optical network unit, of an optical signal sent from the optical line terminal through the optical fiber, performing, by the optical line terminal, discovery processing for designating a reception level and searching for and registering an unregistered optical network unit, responding, by the unregistered optical network unit, to the discovery processing when the reception level designated by the optical line terminal corresponds to the reception level category set in the unregistered optical network unit, and registering, by the optical line terminal, an optical network unit that has responded to the discovery processing.

According to the above, the optical line terminal registers an optical network unit having a reception level category corresponding to the designated reception level category. Therefore, the optical network unit can be managed based on the reception level category.

(25) A data structure according to one manner of the present invention is a data structure used for discovery processing in a PON system for causing an optical line terminal to recognize an unregistered optical network unit.

The discovery processing includes searching, by the optical line terminal, for an optical network unit having a reception level category designated by the optical line terminal. The data structure includes a reception level category for notification from the optical line terminal to the optical network unit.

According to the above, the optical network unit can obtain data for determining in the optical network unit, whether or not the registered reception level category corresponds to the designated reception level category.

Details of Embodiments of Present Invention

Embodiments of the present invention will be described hereinafter with reference to the drawings. The same or corresponding elements in the drawings have the same reference numerals allotted and description thereof will not be repeated.

In the description below, a PON is shown as one embodiment of an optical communication system. The "PON" includes an Ethernet™ passive optical network (EPON) unless it is limited.

First Embodiment

FIG. 1 is a diagram showing an exemplary configuration of an optical communication system according to a first embodiment. As shown in FIG. 1, a PON system 300 includes an optical line terminal (OLT) 100, an optical network unit (ONU) 200, and an optical distribution network 301.

Optical distribution network 301 includes an optical fiber line and an optical splitter 302. OLT 100 and ONU 200 are connected to optical distribution network 301.

An optical distribution network (ODN) section 306 is a section of optical distribution network 301 including optical splitter 302 and lying between definition points 304 and 305. Optical splitter 302 branches optical distribution network 301. A plurality of ONUs can thus be connected to optical distribution network 301. FIG. 1 representatively shows one ONU 200.

PON system 300 implements a 100 Gbps-class PON (for example, 100G-EPON). In 100G-EPON, a fiber line the same as in 10G-EPON is used to transmit four optical signals that are different in wavelength from one another and each have a transmission capacity of 25.78125 Gb/s (which is denoted as "25 Gbps" below).

OLT 100 includes a light transmission path 101, a light reception path 102, a diplexer filter 103, semiconductor optical amplifiers (SOAs) 105a, 105b, 105c, 105d, 106a, 106b, 106c, and 106d, an optical multiplexer 110, an optical demultiplexer 120, light transmitters 111 to 114, and light receivers 121 to 124. OLT 100 can include a module (for example, an optical transceiver) including elements above. FIG. 1 shows a configuration of OLT 100 relating to transmission and reception of an optical signal.

Light transmission path 101 and light reception path 102 are defined by an optical waveguide and an optical fiber. Diplexer filter 103 is a component that optically separates light transmission path 101 and light reception path 102 from each other.

Each of light transmitters 111 to 114 includes, for example, an electro-absorption modulator laser diode (EML) as a light emitting element that generates an optical signal. Light transmitters 111 to 114 emit light different in wavelength from one another. Each light transmitter has a transmission capacity of 25 Gbps. Therefore, 25 Gbps×four channels is implemented. To which one of four channels each light transmitter is allocated is not particularly limited.

SOAs 105a, 105b, 105c, and 105d amplify optical signals emitted from respective light transmitters 111 to 114. Optical multiplexer 110 multiplexes by wavelength multiplexing, four optical signals amplified by SOAs 105a, 105b, 105c, and 105d.

Light transmission path 101 optically couples optical multiplexer 110 and SOAs 105a, 105b, 105c, and 105d to light transmitters 111 to 114. An optical signal from optical multiplexer 110 is transmitted through light transmission path 101. The optical signal passes through diplexer filter 103 and is sent from OLT 100 to optical distribution network 301.

OLT 100 receives an optical signal from ONU 200. This optical signal is a burst signal. The burst signal passes through diplexer filter 103 and is routed to light reception path 102. The optical signal from ONU 200 is a wavelength division multiplexed (WDM) optical signal. Optical demultiplexer 120 splits the optical signal transmitted through light reception path 102 into four optical signals based on a wavelength.

Light reception path 102 is optically coupled to SOAs 106a, 106b, 106c, and 106d by being optically coupled to optical demultiplexer 120. SOAs 106a, 106b, 106c, and 106d are provided in stages preceding light receivers 121 to 124, respectively, and amplify an optical signal input from optical demultiplexer 120.

Each of light receivers 121 to 124 is a light receiver high in sensitivity, and includes, for example, an avalanche photodiode (APD) as a light reception element. Light receivers 121, 122, 123, and 124 are associated with four respective channels.

OLT 100 further includes an OLT control unit 130, an ONU information manager 131, and a gain control unit 132. OLT control unit 130 controls an operation by OLT 100. ONU information manager 131 registers an ONU corresponding to a reception level category designated by OLT 100 in discovery processing for searching for and registering an unregistered ONU. ONU information manager 131 thus manages information on the reception level of each ONU 200.

The SOA is an amplifier having a variable gain. Gain control unit 132 controls a gain of SOAs 106a, 106b, 106c, and 106d based on information managed by ONU information manager 131 (the reception level of each ONU 200).

In one embodiment, OLT control unit 130, ONU information manager 131, and gain control unit 132 are implemented by a single semiconductor circuit. OLT control unit 130, ONU information manager 131, and gain control unit 132 may be implemented by individual semiconductor integrated circuits. Any two of OLT control unit 130, ONU information manager 131, and gain control unit 132 may be implemented by a single semiconductor integrated circuit. Examples of such a semiconductor integrated circuit can include an application specific integrated circuit (ASIC) and a field programmable gate array (FPGA).

In the configuration shown in FIG. 1, OLT control unit 130, ONU information manager 131, and gain control unit 132 are included in OLT 100. At least one of OLT control unit 130, ONU information manager 131, and gain control unit 132, however, may be provided outside OLT 100.

ONU 200 includes a light transmission path 201, a light reception path 202, a diplexer filter 203, a light propagation path 204, an optical multiplexer 210, an optical demultiplexer 220, light transmitters 211 to 214, light receivers 221 to 224, an ONU control unit 240, a received signal strength indication (RSSI) circuit 241, and a reception level category registration/holding unit 243. ONU 200 can include a module (for example, an optical transceiver) including elements above.

The module of ONU 200 may include a selective element from among the constituent elements shown in FIG. 1. The "selective element" may be, for example, light transmission path 201, light reception path 202, diplexer filter 203, optical multiplexer 210, optical demultiplexer 220, light transmitters 211 to 214, and light receivers 221 to 224. The "selective element" may include light transmitters and light receivers equal to each other in number selected from among light transmitters 211 to 214 and light receivers 221 to 224. In this case, OLT 100 can also similarly include as "selective elements," light transmitters and light receivers equal to each other in number selected from among light transmitters 111 to 114 and light receivers 121 to 124.

Light transmission path 201, light reception path 202, and light propagation path 204 are defined by a light waveguide and an optical fiber. Diplexer filter 203 is a component that optically separates light transmission path 201 and light reception path 202 from each other. Light propagation path 204 is a propagation path common to light transmission path 201 and light reception path 202. Optical multiplexer 210 is arranged in light transmission path 201. Optical demultiplexer 220 is arranged in light reception path 202.

Each of light transmitters 211 to 214 can include an EML as a light emitting element. Instead, a light emitting element of each of light transmitters 211 to 214 may be implemented by a direct modulation laser diode (DML). Light transmitters 211 to 214 emit optical signals different in wavelength from one another. This optical signal is a burst signal.

Each light transmitter has a transmission capacity of 25 Gbps. Therefore, 25 Gbps×four channels is implemented. To which one of four channels each light transmitter is allocated is not particularly limited.

Optical multiplexer 210 multiplexes by wavelength multiplexing, four optical signals emitted from light transmitters 211 to 214. The multiplexed optical signal is transmitted through light transmission path 201 and passes through diplexer filter 203. The optical signal transmitted through light transmission path 201 is sent to optical distribution network 301 as an upstream optical signal from ONU 200.

ONU 200 receives an optical signal from OLT 100. The optical signal is transmitted through light propagation path 204 and routed to light reception path 202 by diplexer filter 203. Optical demultiplexer 220 splits the optical signal transmitted through light reception path 202 into four optical signals based on a wavelength. The four optical signals are input to respective light receivers 221 to 224.

Each of light receivers 221 to 224 is a light receiver high in sensitivity. Each of light receivers 221 to 224 can include an avalanche photodiode as a light reception element. Light receivers 221, 222, 223, and 224 are associated with four respective channels.

RSSI circuit 241 is a monitoring circuit that monitors a reception level (received signal intensity) of ONU 200. In one embodiment, RSSI circuit 241 monitors a reception level in any one of four channels. RSSI circuit 241 may monitor a maximum value or a minimum value of the reception level in four channels. Alternatively, RSSI circuit 241 may monitor an average value of the reception level in the four channels.

Reception level category registration/holding unit 243 is a registration unit that registers a reception level category of ONU 200. Reception level category registration/holding unit 243 registers a category of a reception level of ONU 200 based on an output from RSSI circuit 241 and holds information on the reception level category. In the first embodiment, the reception level of ONU 200 is categorized, for example, into "high", "intermediate", and "low".

In one embodiment, ONU control unit 240, RSSI circuit 241, and reception level category registration/holding unit 243 can be implemented by one semiconductor integrated circuit or a plurality of semiconductor integrated circuits. Examples of such a semiconductor integrated circuit can include an application specific integrated circuit (ASIC) and a field programmable gate array (FPGA).

In the first embodiment, a reception level category for categorizing a reception level in ONU 200, of an optical signal sent from OLT 100 through optical distribution network 301 (optical fiber) is set. OLT 100 registers ONU 200 corresponding to the reception level category in discovery processing for searching for and registering an unregistered ONU.

FIG. 1 and a figure which will be described later show a single ONU 200. It is assumed that this ONU 200 has not yet been registered in OLT 100, although it is connected to optical distribution network 301.

OLT 100 transmits a message which may also be called a discovery gate (Discovery Gate) for searching for and registering an unregistered ONU. OLT 100 designates a reception level category in the discovery gate and transmits the designated discovery gate. Transmission of a discovery gate will also be called a "discovery notification" below.

OLT 100 controls a gain of a reception-side SOA in association with the designated reception level category. The "reception-side SOA" refers to an SOA that amplifies an optical signal received in OLT 100 and it is at least one of SOAs 106a to 106d. When the reception level category is "high", gain control unit 132 lowers a gain of the reception-side SOA. When the reception level category is "low", gain control unit 132 increases the gain of the reception-side SOA.

FIG. 2 is a diagram for illustrating relation between an ONU reception level category and an OLT reception level category according to the first embodiment. As illustrated in FIG. 2, the ONU reception level is categorized into three levels such as "weak", "intermediate", and "strong". The number of categories of the reception level should only be two or more and is not limited to three.

In the first embodiment, the ONU reception level category and the OLT reception level category satisfy one-on-one relation. Therefore, the OLT reception level is also categorized into three levels of "weak", "intermediate", and "strong". A sign shown with a circle in FIG. 2 represents correspondence between the ONU reception level category and the OLT reception level category.

As ODN section 306 shown in FIG. 1 is longer, an optical signal is more attenuated in ODN section 306. Therefore, when the ONU reception level category is "weak", the OLT reception level category is "weak". When ODN section 306 is short, an optical signal is less attenuated in ODN section 306. When the ONU reception level category is "strong", the OLT reception level category is "strong".

As the OLT reception level is lower, the gain of the SOA is made higher. Therefore, the OLT reception level and a gain control category of the reception-side SOA of the OLT are in relation opposite to each other. When the ONU reception level category is "weak", the OLT reception level category is "weak" and the gain control category of the SOA is "strong". When the ONU reception level category is "strong", the OLT reception level category is "strong" and the gain control category of the SOA is "weak". When the ONU reception level category is "intermediate", the OLT reception level category and the gain control category of the SOA are both "intermediate".

A numeric value can be allocated to the reception level category. In the example shown in FIG. 2, "0", "1", and "2" are allocated to "weak", "intermediate", and "strong", respectively.

Relation shown in FIG. 2 is held by OLT 100 and ONU 200 as a rule common to OLT 100 and ONU 200. For example, specifications for each of OLT 100 and ONU 200 to operate in accordance with relation shown in FIG. 2 may be determined in advance. A controller of each of OLT 100 and ONU 200 (OLT control unit 130 and ONU control unit 240) may operate in accordance with a program in which relation shown in FIG. 2 is defined, or may have a memory store information in accordance with FIG. 2. Alternatively, OLT 100 and ONU 200 may receive information in accordance with FIG. 2 from a not-shown external apparatus. Alternatively, ONU 200 may receive information in accordance with FIG. 2 from OLT 100.

Figure 3:
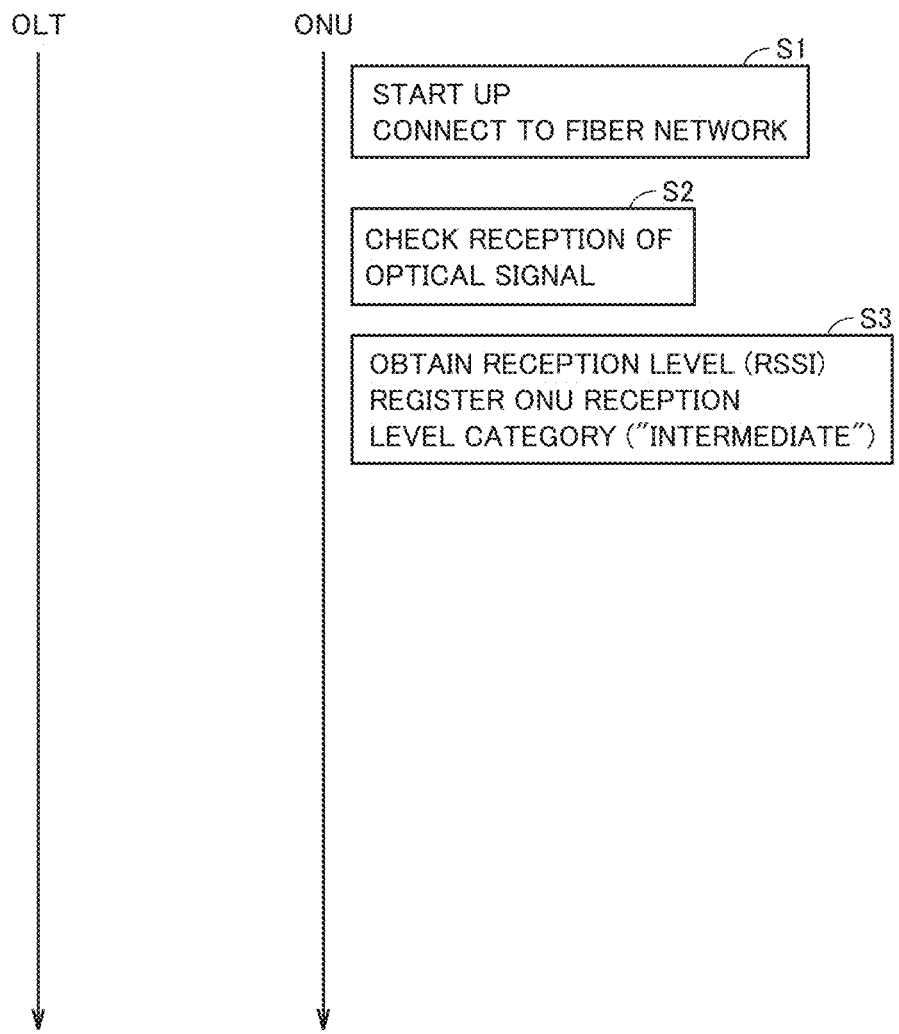
FIG. 3 is a sequence diagram illustrating exemplary processing at the time of start-up of an ONU according to the first embodiment.

FIG. 3 is a sequence diagram illustrating exemplary processing at the time of start-up of the ONU according to the first embodiment. As shown in FIG. 3, in step S1, ONU 200 is started up by turning on the power of ONU 200. ONU 200 can thus optically be coupled to an optical fiber network (optical distribution network 301). In other words, ONU 200 is connected to an optical fiber network.

An optical signal from OLT 100 is distributed to a plurality of ONUs connected to optical distribution network 301. In step S2, ONU 200 checks reception of an optical signal. In step S3, RSSI circuit 241 of ONU 200 obtains a reception level (RSSI) based on an output from a light receiver. Reception level category registration/holding unit 243 registers and holds the reception level category in accordance with the reception level. By way of example, the reception level category is "intermediate".

Figure 4:
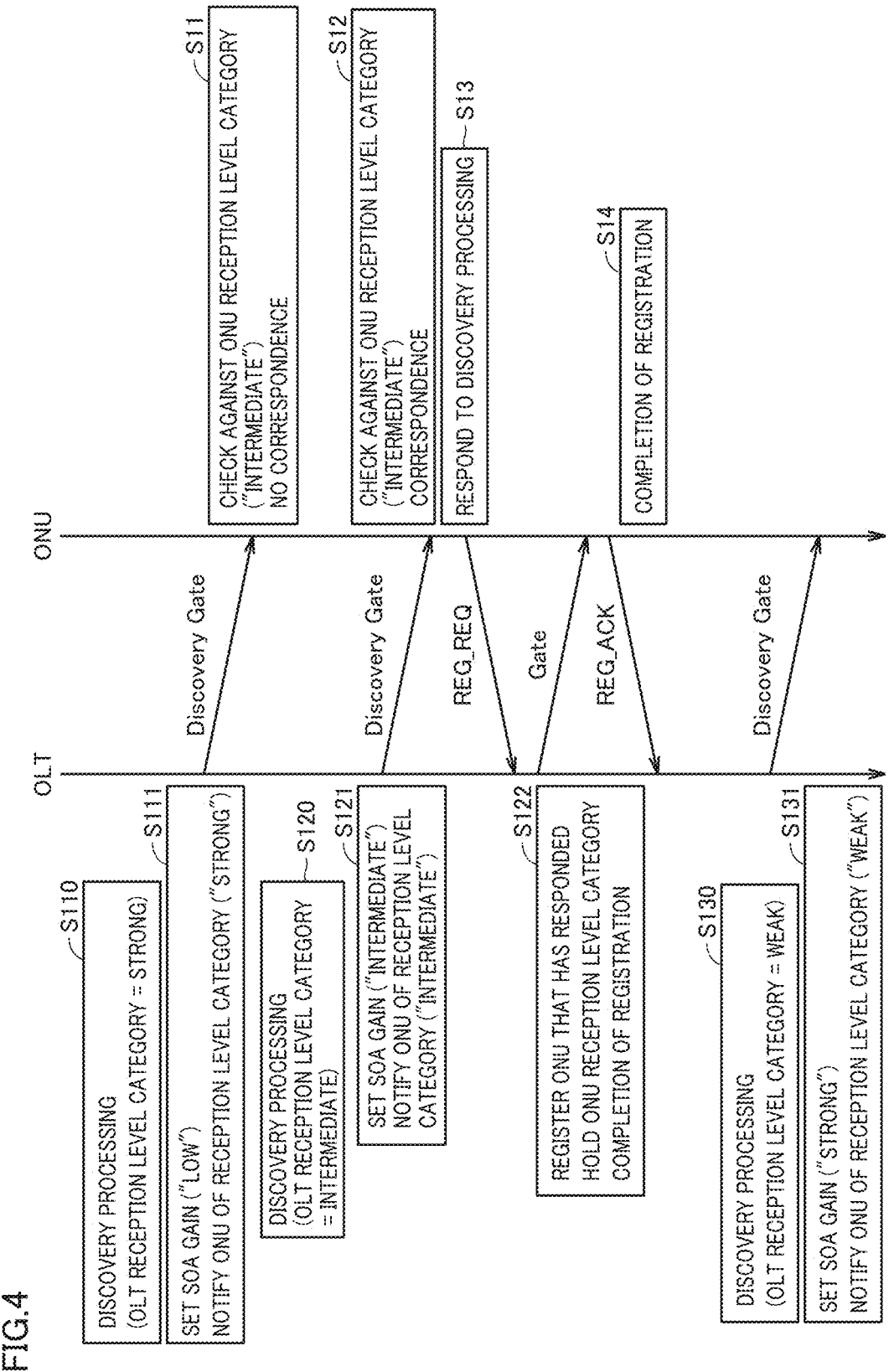
FIG. 4 is a sequence diagram illustrating one example of discovery processing according to the first embodiment.

FIG. 4 is a sequence diagram illustrating one example of discovery processing according to the first embodiment. As shown in FIG. 4, in step S110, discovery processing in which the OLT reception level category is set to "strong" is performed.

Step S110 includes step S111. In step S111, OLT 100 sets a gain of a reception-side SOA to "low". OLT 100 transmits a discovery gate (Discovery Gate) message to give a notification about the reception level category ("strong") of OLT 100. The reception level category of OLT 100 falls under a condition for registering an unregistered ONU.

In step S11, ONU 200 (unregistered ONU) receives the discovery gate message. ONU 200 checks the reception level category included in the discovery gate message (the given reception level category) against the reception level category registered in ONU 200. Since the reception level category registered in ONU 200 is "intermediate", the given reception level category does not correspond to the reception level category registered in ONU 200. Therefore, ONU 200 does not respond to the discovery gate message.

Then, in step S120, discovery processing in which the OLT reception level category is set to "intermediate" is performed. Step S120 includes steps S121 and S122. In step S121, OLT 100 sets the gain of the reception-side SOA to "intermediate". OLT 100 transmits a discovery gate message to give a notification about the reception level category ("intermediate") of OLT 100.

In step S12, ONU 200 receives the discovery gate message. ONU 200 checks the reception level category included in the discovery gate message against the reception level category registered in ONU 200. The given reception level category corresponds to the reception level category registered in ONU 200. Therefore, in step S13, ONU 200 responds to the discovery gate message.

ONU 200 transmits a registration request (REG_REQ) to OLT 100. In step S122, OLT 100 registers the ONU (ONU 200) that has responded to the discovery gate message. OLT 100 sends a registration (Register) message to ONU 200 to give a notification about a logical link ID (LLID). OLT 100 transmits a gate (Gate) message for notifying ONU 200 of a transmission band and transmission timing. ONU 200 transmits an acknowledgement (REG_ACK) of the registration message (Register) to OLT 100 (step S14).

OLT 100 holds the reception level category of the registered ONU. Information on the reception level category of the ONU is held in ONU information manager 131.

In succession, in step S130, discovery processing in which the OLT reception level category is set to "weak" is performed. Step S130 includes step S131. In step S131, OLT 100 sets the gain of the reception-side SOA to "strong". OLT 100 transmits a discovery gate message to give a notification about the reception level category ("weak") of OLT 100.

OLT 100 repeatedly performs processing in steps S110, S120, and S130. In an unregistered ONU, reception level category registration/holding unit 243 determines whether or not the registered reception level category corresponds to the reception level category designated by OLT 100.

The ONU corresponding to the designated reception level category responds to the discovery notification from OLT 100. In this case, reception level category registration/holding unit 243 gives transmission permission to at least one of light transmitters 211 to 214. ONU 200 transmits a signal of response (registration request) to the discovery notification.

OLT 100 receives a registration request from ONU 200. ONU information manager 131 registers ONU 200 together with the reception level category of ONU 200. OLT 100 registers the ONU corresponding to the reception level category designated by OLT 100. OLT 100 can thus manage the reception level category of each of a plurality of registered ONUs.

Figure 5:
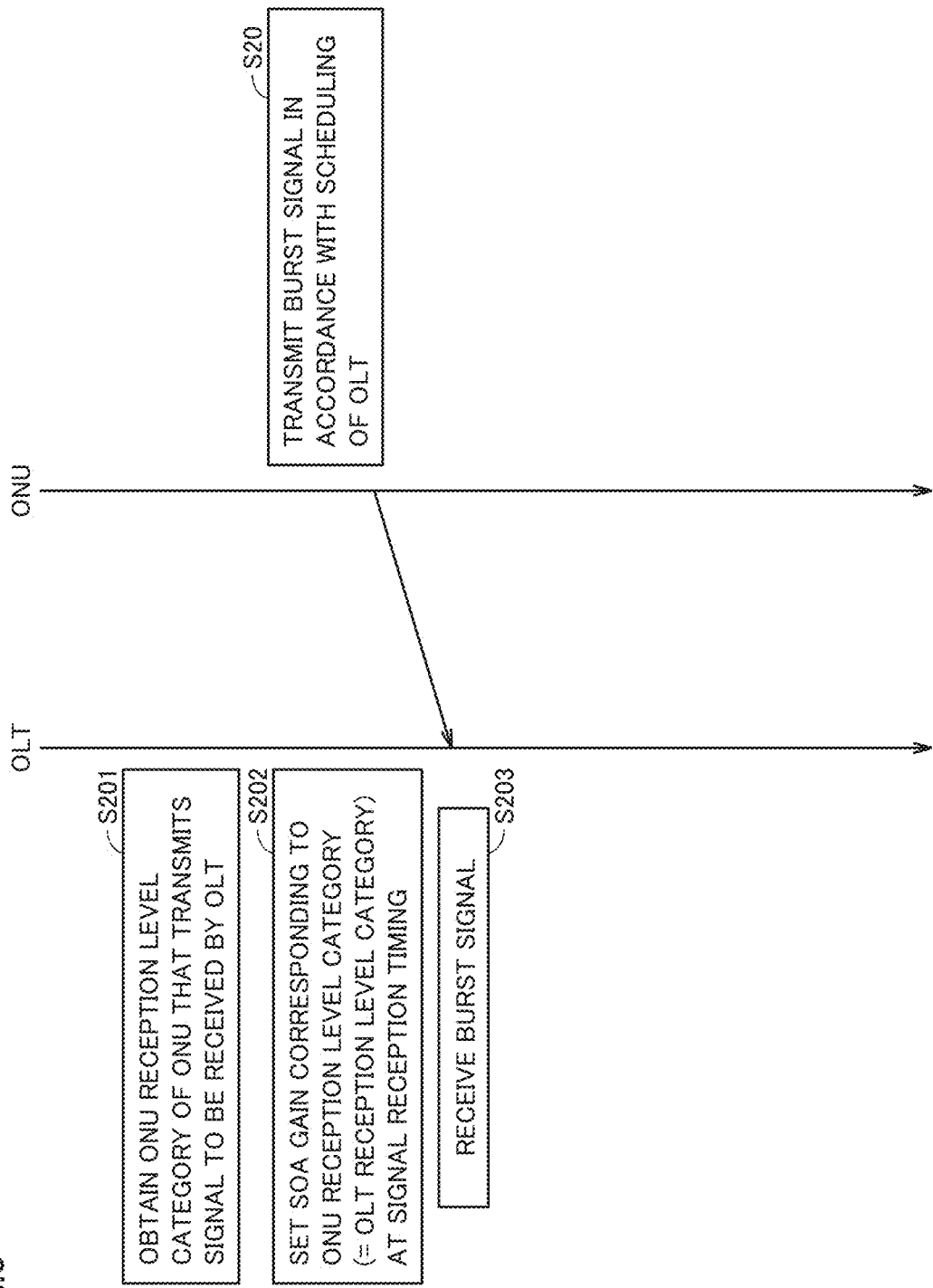
FIG. 5 is a sequence diagram illustrating exemplary normal processing according to the first embodiment.

FIG. 5 is a sequence diagram illustrating exemplary normal processing according to the first embodiment. In normal processing after completion of registration processing, that is, communication between OLT 100 and ONU 200, OLT 100 receives a burst signal from ONU 200. OLT 100 designates for ONU 200, timing of transmission of a burst signal by ONU 200 by allocating a band. Therefore, OLT 100 knows timing of transmission of the burst signal by ONU 200. In step S201, OLT 100 obtains the reception level category of an ONU which will transmit a signal to be received by OLT 100.

In step S202, OLT 100 sets the gain of the reception-side SOA corresponding to the ONU reception level category at the timing of reception of the signal. As shown in FIG. 2, the ONU reception level category and the OLT reception level category are associated with each other. Gain control unit 132 reads information on the reception level category of ONU 200 from ONU information manager 131. Gain control unit 132 controls the gain of the reception-side SOA in accordance with the timing of reception of the burst signal.

In step S20, ONU 200 transmits the burst signal at transmission timing designated by OLT 100. In step S203, OLT 100 receives the burst signal. At this time, the reception-side SOA of OLT 100 amplifies the burst signal with the gain in accordance with the OLT reception level category.

Figure 6:
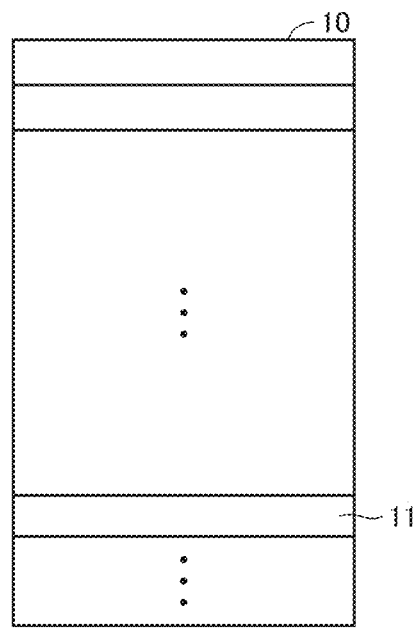
FIG. 6 is a diagram schematically showing a part of a data structure of a discovery gate message according to a first form.

FIG. 6 is a diagram schematically showing a part of a data structure of a discovery gate message according to a first form. As shown in FIG. 6, a discovery gate message 10 includes an OLT reception level category 11 for notifying from OLT 100, an unregistered ONU of the reception level category set by OLT 100. A position of OLT reception level category 11 in discovery gate message 10 and a data length of OLT reception level category 11 are not limited.

According to the first embodiment, OLT 100 can set the gain of the reception-side SOA prior to reception of the burst signal. When the burst signal is strong, OLT 100 can start reception of the burst signal with the gain of the reception-side SOA being low. Entry of strong light to the light receiver of OLT 100 can thus be prevented. Therefore, possibility of damage to a light reception element included in the light receiver can be lowered. While gain control in reception of an optical signal from an unregistered ONU is guaranteed, that ONU can be registered in discovery processing.

In order to control the gain of the reception-side SOA after detection of intensity of the burst signal in the OLT, a high-speed level detection circuit is required. Alternatively, a branch element and an optical element such as an optical fiber for delaying signal light as shown in PTLs 3 and 4 are required. In contrast, according to the first embodiment, a high-speed level detection circuit or an additional optical component is not required. Therefore, reduction in cost or size of OLT 100 can be achieved. Furthermore, the problem of insertion loss due to addition of an optical component can also be avoided.

Second Embodiment

Figure 7:
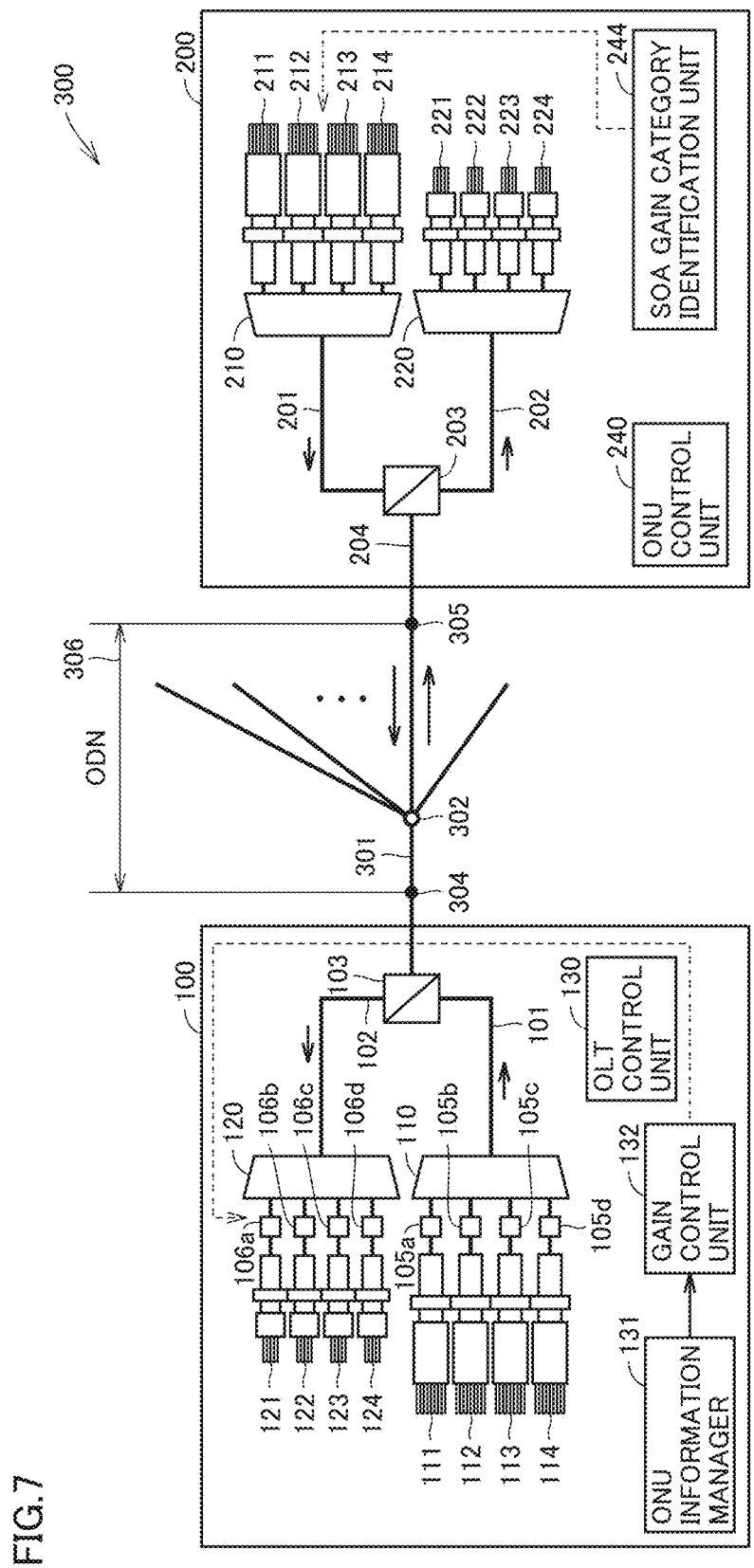
FIG. 7 is a diagram showing an exemplary configuration of the optical communication system according to a second embodiment.

FIG. 7 is a diagram showing an exemplary configuration of the optical communication system according to a second embodiment. The second embodiment is different in configuration of ONU 200 from the first embodiment. As shown in FIG. 7, RSSI circuit 241 is not provided in ONU 200. Instead of reception level category registration/holding unit 243, an SOA gain category identification unit 244 is provided in ONU 200.

SOA gain category identification unit 244 holds records of registration processing. SOA gain category identification unit 244 associates the reception level category of ONU 200 with a result of response to discovery (success or failure).

ONU 200 attempts to perform registration processing with the ONU reception category being varied. By way of example, the reception level category of ONU 200 includes "strong", "intermediate", and "weak". Relation between the ONU reception level category and the OLT reception level category according to the second embodiment can be equal to relation in the first embodiment (see FIG. 2).

Figure 8:
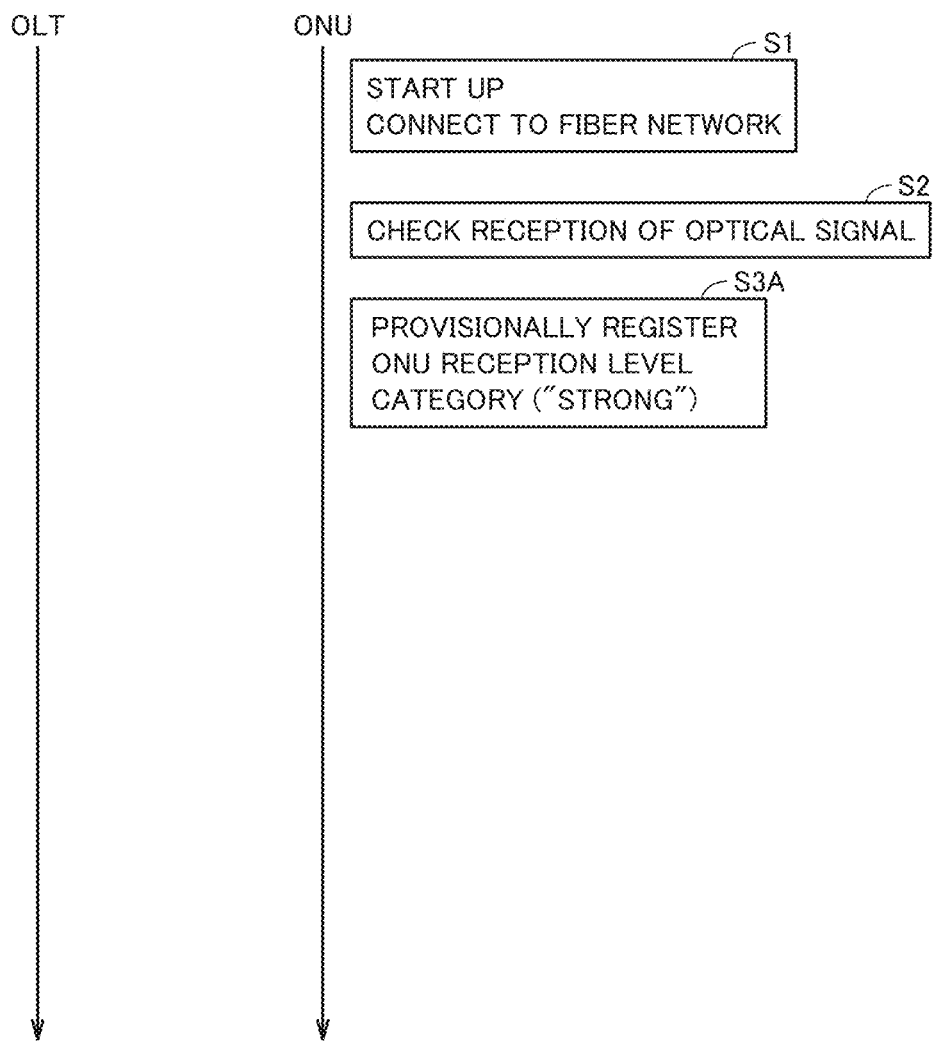
FIG. 8 is a sequence diagram illustrating exemplary processing at the time of start-up of the ONU according to the second embodiment.

FIG. 8 is a sequence diagram illustrating exemplary processing at the time of start-up of the ONU according to the second embodiment. Processing in steps S1 and S2 shown in FIG. 8 is the same as corresponding processing shown in FIG. 3. In step S3A, ONU 200 makes initial setting of the ONU reception level category. The reception category of ONU 200 is initially set to "strong". SOA gain category identification unit 244 provisionally registers "strong" as the ONU reception level category.

Figure 9:
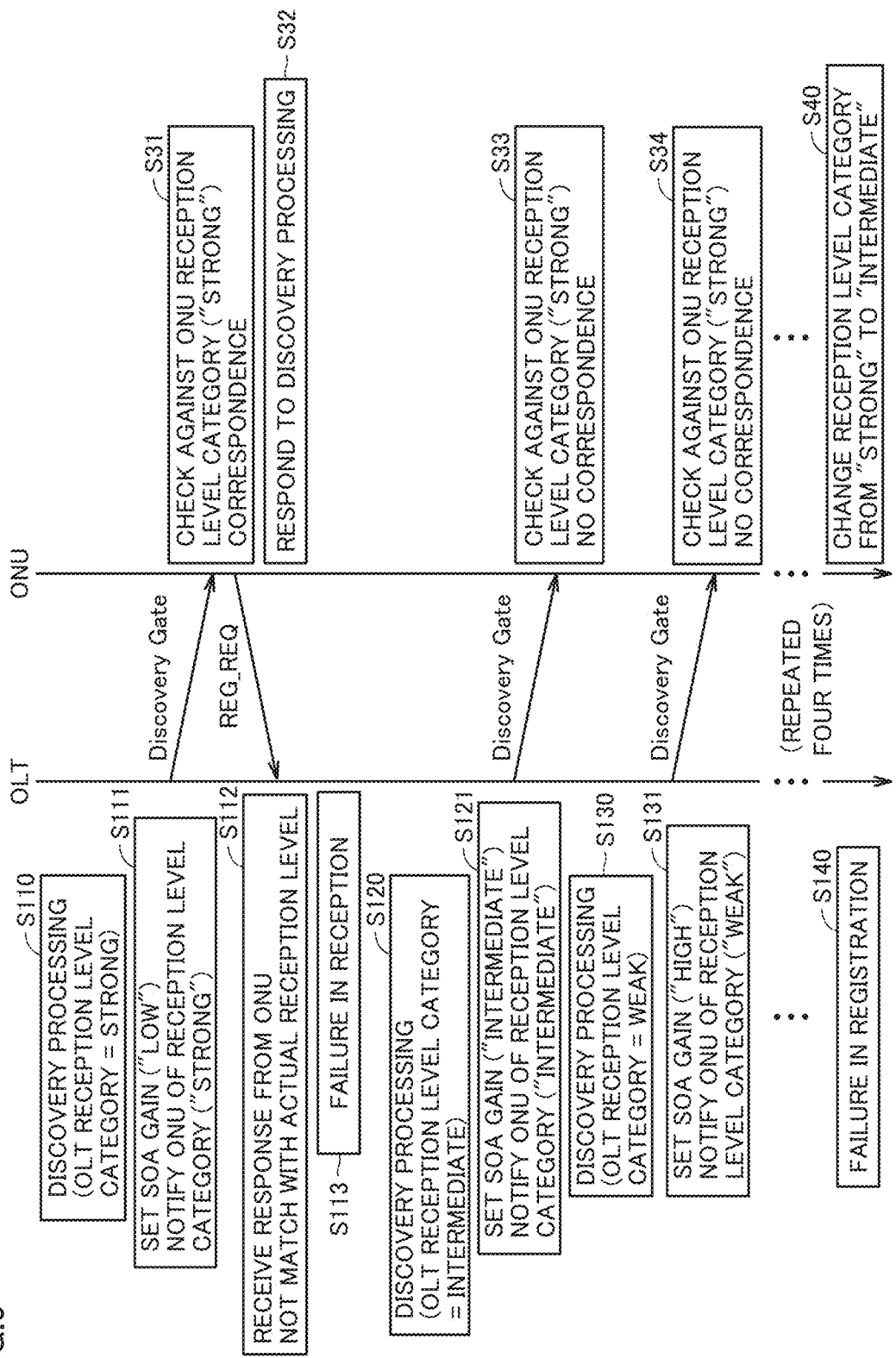
FIG. 9 is a sequence diagram illustrating one example of discovery processing (failure in registration of an ONU) according to the second embodiment.

FIG. 9 is a sequence diagram illustrating one example of discovery processing (failure in registration of an ONU) according to the second embodiment. As shown in FIG. 9, in step S110, discovery processing in which the OLT reception level category is set to "strong" is performed. In step S111, OLT 100 sets the gain of the reception-side SOA to "low". OLT 100 transmits a discovery gate message to give a notification about the reception level category ("strong") of OLT 100.

In step S31, an unregistered ONU (ONU 200) receives the discovery gate message and checks the reception level category included in the discovery gate message (the given reception level category) against the reception level category provisionally registered in ONU 200. Since the reception level category registered in ONU 200 is "strong", the given reception level category corresponds to the registered reception level category.

In step S32, ONU 200 responds to the discovery gate message and transmits a registration request (REG_REQ) to OLT 100.

OLT 100 receives response from ONU 200 in step S112. When an actual reception level is "intermediate", the actual reception level does not match with the reception level category (="strong") of the ONU. In this case, OLT 100 is unable to receive the optical signal from ONU 200 at the appropriate SOA gain and fails in reception (step S113).

Then, in step S120, discovery processing in which the OLT reception level category is set to "intermediate" is performed. In step S121, OLT 100 sets the gain of the reception-side SOA to "intermediate". OLT 100 transmits a discovery gate message to give a notification about the reception level category ("intermediate") of OLT 100.

In step S33, ONU 200 receives the discovery gate message. The given reception level category does not correspond to the reception level category registered in ONU 200. Therefore, ONU 200 does not respond to the discovery gate message.

In succession, in step S130, discovery processing in which the OLT reception level category is set to "weak" is performed. In step S131, OLT 100 sets the gain of the reception-side SOA to "high". OLT 100 transmits a discovery gate message to give a notification about the reception level category ("weak") of OLT 100.

In step S34, ONU 200 receives the discovery gate message. The given reception level category does not correspond to the reception level category registered in ONU 200. Therefore, ONU 200 does not respond to the discovery gate message.

As a result of a series of processing in steps S31 to S34, ONU 200 determines that discovery processing has failed. OLT 100 repeats a series of processing in S110 to S130. Since the provisionally registered reception level category of unregistered ONU 200 is "strong", ONU 200 determines that discovery processing has failed each time processing in S110 to S130 is repeated.

Failure in discovery processing described above is repeated four times. The total number of times of failure in discovery processing reaches five. Therefore, OLT 100 does not register ONU 200. Registration of ONU 200 in OLT 100 fails (step S140). ONU 200 changes the reception level category by one level due to failure in registration processing. The reception level category is changed from "strong" to "intermediate" (step S40).

In discovery processing, a plurality of unregistered ONUs may simultaneously respond. In this case, response messages from the plurality of ONUs collide and OLT 100 is unable to receive the response messages. Therefore, even though discovery processing fails, discovery processing is repeated with the same reception level category being maintained. ONU 200 receives a discovery gate message and responds after a random delay time. Therefore, collision of messages can be avoided by repeating discovery processing.

Figure 10:
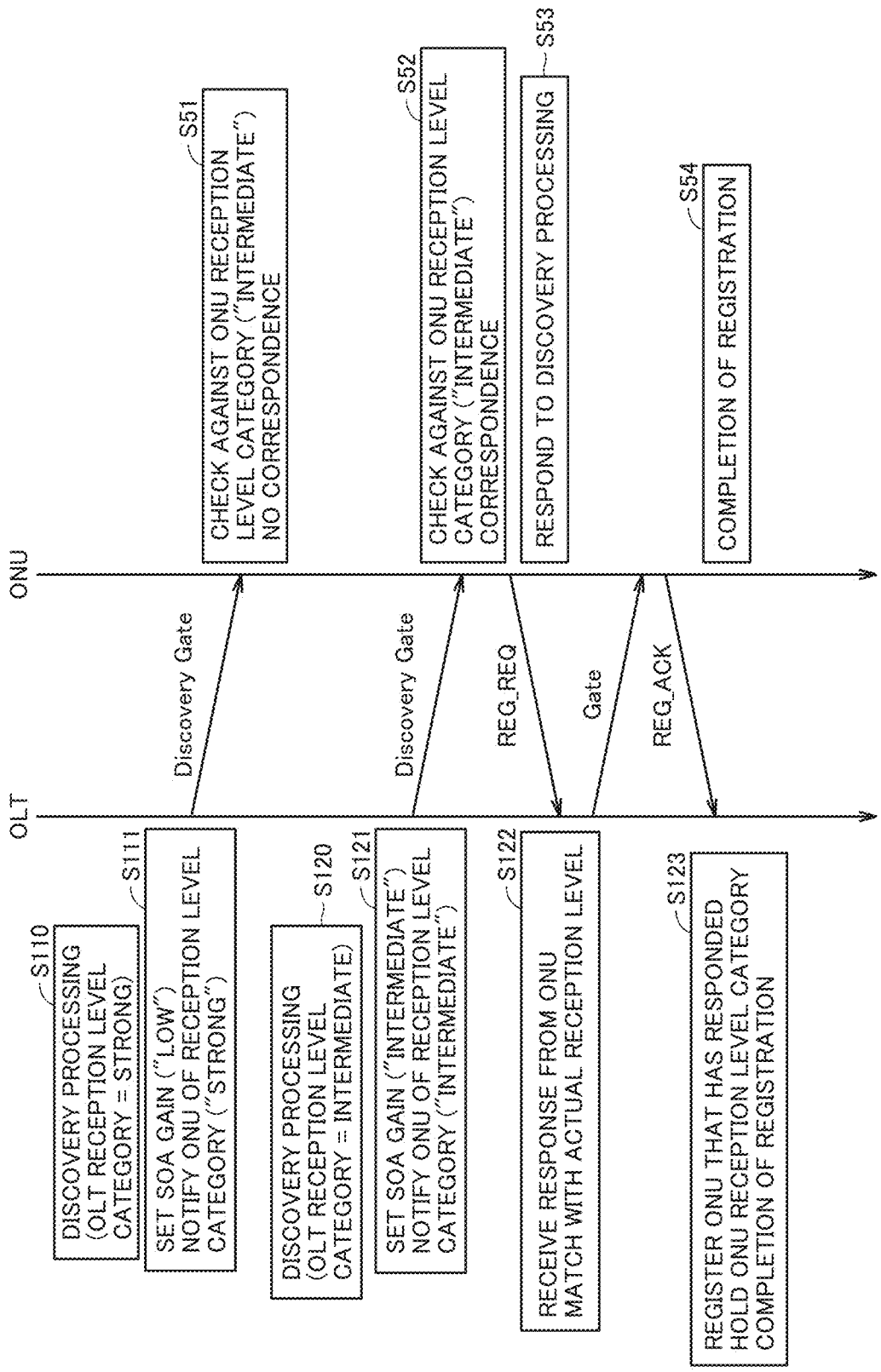
FIG. 10 is a sequence diagram illustrating one example of discovery processing (success in registration of an ONU) according to the second embodiment.

FIG. 10 is a sequence diagram illustrating one example of discovery processing (success in registration of an ONU) according to the second embodiment. As shown in FIG. 10, in step S110, discovery processing in which the OLT reception level category is set to "strong" is performed. In step S111, OLT 100 sets the gain of the reception-side SOA to "low". OLT 100 transmits a discovery gate message to give a notification about the reception level category ("strong") of OLT 100.

In step S51, ONU 200 receives the discovery gate message and checks the reception level category included in the discovery gate message (the given reception level category) against the reception level category registered in ONU 200. Since the reception level category registered in ONU 200 is "intermediate", the given reception level category does not correspond to the reception level category registered in ONU 200. Therefore, ONU 200 does not respond to the discovery gate message.

Then, in step S120, discovery processing in which the OLT reception level category is set to "intermediate" is performed. In step S121, OLT 100 sets the gain of the reception-side SOA to "intermediate". OLT 100 transmits a discovery gate message to give a notification about the reception level category ("intermediate") of OLT 100.

In step S52, ONU 200 receives the discovery gate message and checks the reception level category included in the discovery gate message against the reception level category registered in ONU 200. The reception level category given in the discovery gate message corresponds to the reception level category registered in ONU 200. Therefore, in step S53, ONU 200 responds to the discovery gate message.

In step S122, OLT 100 receives response from ONU 200. Since the actual reception level is "intermediate", it matches with the ONU reception level category. In this case, since OLT 100 is able to receive the optical signal from ONU 200 at the appropriate SOA gain, it succeeds in reception (step S122). OLT 100 registers ONU 200 (step S123). Since processing for registering ONU 200 is the same as the processing described above, description will not be repeated. Registration of ONU 200 is completed (step S54).

When registration processing has failed a plurality of times, ONU 200 determines that the current reception category is inappropriate. In this case, ONU 200 changes the reception level category from "strong" to "intermediate" or from "intermediate" to "weak" and attempts again to perform registration processing.

Change in reception level category in ONU 200 is based on information on the reception level category stored in SOA gain category identification unit 244. Each of OLT 100 and ONU 200 fixes the reception level category at the time when registration processing is successful. In ONU 200, SOA gain category identification unit 244 can store the fixed reception level category.

According to the second embodiment, a circuit (RSSI circuit) for monitoring reception intensity of the ONU does not have to be mounted on the ONU side. Therefore, the configuration of the ONU can be simplified.

According to the second embodiment, the ONU attempts to respond to a discovery notification in the ascending order of the SOA gain without fail. OLT 100 sets as the reception level category of an unregistered ONU, the reception level category designated in discovery processing under which response was successful. Therefore, possibility of damage to the receiver of OLT 100 by light from the ONU can be lowered.

As in the first embodiment, an order of setting and change of the SOA gain category of the OLT and the reception level category of the ONU can be held in OLT 100 and ONU 200 as a rule common to OLT 100 and ONU 200.

Third Embodiment

An optical communication system according to a third embodiment is basically similar in configuration to the optical communication system according to the first embodiment (see FIG. 1). In the third embodiment, a table of correspondence between an ONU reception level category and a reception category of an OLT that attempts to perform registration processing is used. This correspondence table is stored, for example, in OLT 100 such as a memory of an optical transceiver as mapping information. OLT 100 gives mapping information to an ONU. Therefore, OLT 100 and the ONU can share information on a characteristic of an SOA of OLT 100. The reception level category can thus optimally be set in accordance with a characteristic of the SOA in OLT 100. For example, gain control in consideration of individual variation in characteristic of the amplifier can be achieved.

FIG. 11 is a diagram schematically showing one example of mapping information applicable to the third embodiment. As shown in FIG. 11, a plurality of (for example, two) OLT reception level categories are brought in correspondence with a single ONU reception level category. The third embodiment is different from the first and second embodiments in this regard.

In two adjacent categories of the ONU reception level categories, candidates for the OLT reception level category overlap. In the example shown in FIG. 11, OLT reception level categories "strong" and "intermediate to strong" correspond to "strong" of the ONU reception level category, and OLT reception level categories "intermediate to strong" and "intermediate to weak" correspond to "intermediate" of the ONU reception level category. Therefore, the OLT reception level category "intermediate to strong" is an overlapping candidate.

Detection of RSSI in ONU 200 may contain an error. Therefore, the ONU reception level category and the OLT reception level category may not exactly match with each other. By bringing a plurality of (for example, two) OLT reception level categories in correspondence with a single ONU reception level category, a more suitable OLT reception level category can be brought in correspondence with each ONU reception level category.

As in the first embodiment, RSSI circuit 241 of ONU 200 monitors the reception level of ONU 200. The ONU reception level is categorized, for example, into "strong", "intermediate", and "weak". Reception level category registration/holding unit 243 registers the ONU reception level category monitored by RSSI circuit 241.

In the third embodiment, a plurality of SOA gains are brought in correspondence with a single ONU reception level category. The ONU attempts to give discovery response in the ascending order of the SOA gain.

Figure 12:
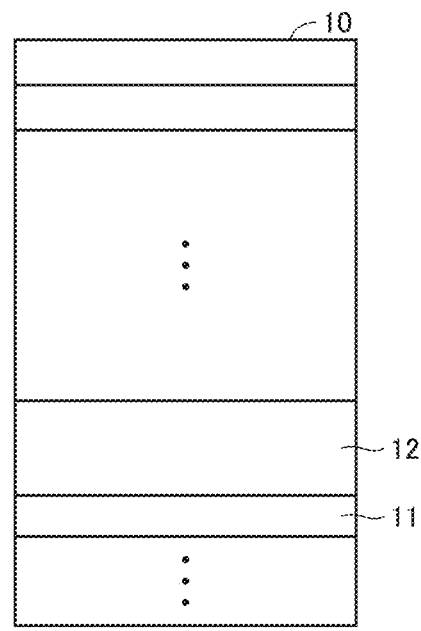
FIG. 12 is a diagram schematically showing a part of a data structure of a discovery gate message according to the third embodiment.

FIG. 12 is a diagram schematically showing a part of a data structure of a discovery gate message according to the third embodiment. As shown in FIG. 12, discovery gate message 10 includes OLT reception level category 11 and mapping information 12 as items thereof. OLT 100 shares information on a characteristic of the SOA of OLT 100 (mapping information) with the ONU by transmitting a discovery gate message.

Figure 13:
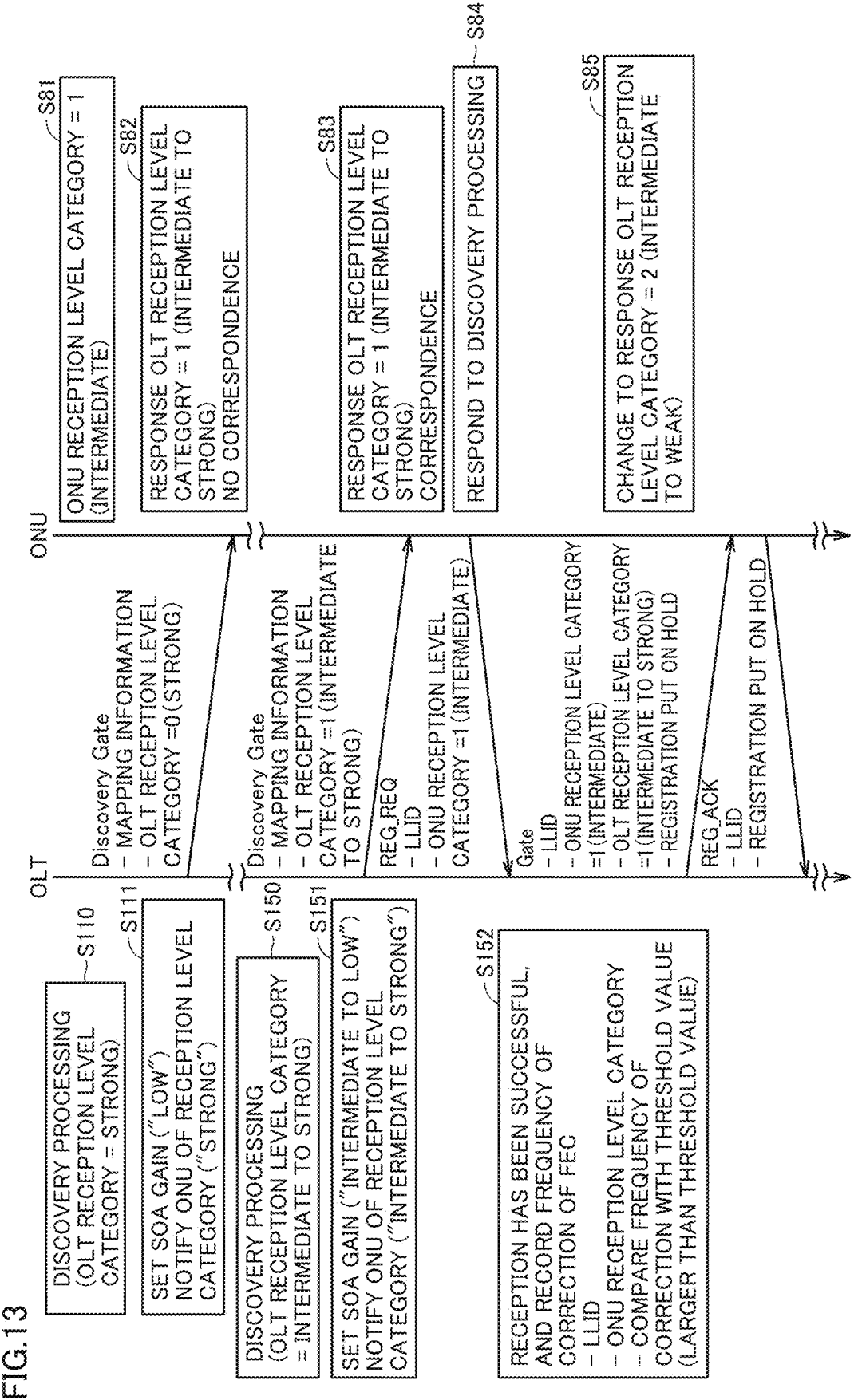
FIG. 13 is a first sequence diagram illustrating one example of discovery processing according to the third embodiment.

FIG. 13 is a first sequence diagram illustrating exemplary discovery processing according to the third embodiment.

Figure 14:
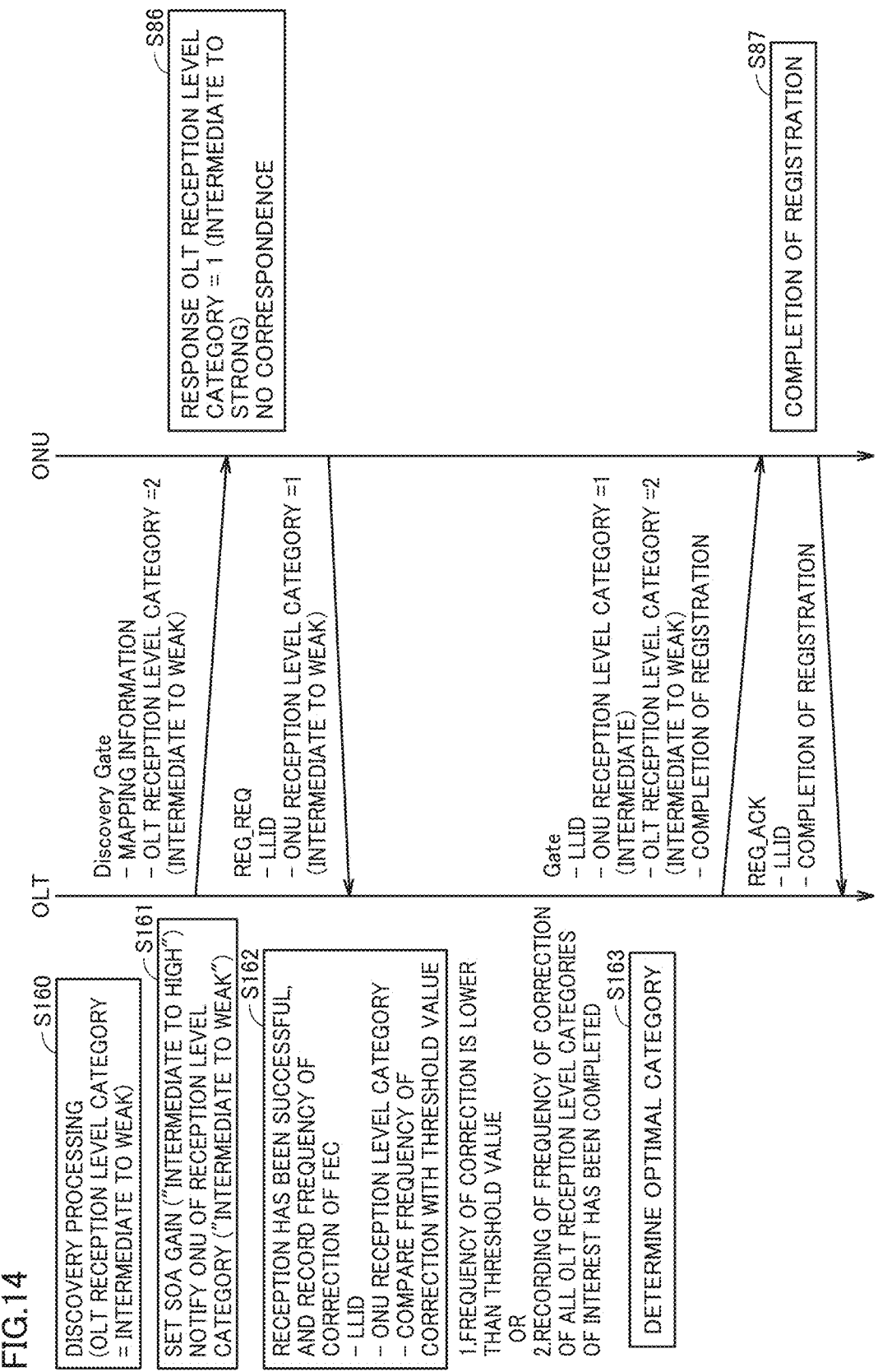
FIG. 14 is a second sequence diagram illustrating processing following the processing shown in FIG. 13.

FIG. 14 is a second sequence diagram illustrating processing following the processing shown in FIG. 13.

As shown in FIG. 13, in step S81, an unregistered ONU registers the ONU reception level category based on a result of monitoring of RSSI. In this example, ONU reception level category=1 ("intermediate") is registered.

In step S110, discovery processing in which the OLT reception level category is set to "strong" is performed. In step S111, OLT 100 sets the gain of the reception-side SOA to "low". OLT 100 transmits a discovery gate message to give a notification about the reception level category=0 ("strong") of OLT 100 together with mapping information.

In step S82, ONU 200 receives the discovery gate message and checks the reception level category included in the discovery gate message (the given reception level category) against the reception level category registered in ONU 200. Since the reception level category registered in ONU 200 is "intermediate", the given reception level category does not correspond to the reception level category registered in ONU 200. Therefore, ONU 200 does not respond to the discovery gate message.

Then, in step S150, discovery processing in which the OLT reception level category is set to "intermediate to strong" is performed. Step S150 includes steps S151 and S152. In step S151, OLT 100 sets the gain of the reception-side SOA to "intermediate to low." OLT 100 transmits a discovery gate message to give a notification about the reception level category=1 ("intermediate to strong") of OLT 100 together with mapping information.

In step S83, ONU 200 receives the discovery gate message. The given reception level category corresponds to the reception level category registered in ONU 200. Therefore, in step S84, ONU 200 responds to discovery processing by transmitting a registration request (REG_REQ) message. In the third embodiment, the registration request message includes also the ONU reception level category. In the example described above, the ONU reception level category is "1" (that is, "intermediate").

In step S152, OLT 100 successfully receives the registration request message. OLT 100 evaluates whether or not ONU 200 can be registered without immediately registering ONU 200. In one embodiment of evaluation, OLT 100 checks a frequency of correction in error correction processing for a message from ONU 200. Furthermore, OLT 100 determines whether or not the frequency of correction is equal to or lower than a threshold value. When the frequency of correction is higher than the threshold value, OLT 100 puts registration of ONU 200 on hold. OLT 100 records the frequency of correction.

OLT 100 sets the OLT reception level category to a category in accordance with the following order. In this case, the OLT reception level category is changed from "0" ("strong") to "1" ("intermediate to strong"). OLT 100 transmits a gate message to the ONU. The gate message includes the LLID, the ONU reception level category (in this case, "1" ("intermediate")), and the OLT reception level category (in this case, "1" ("intermediate to strong")). The gate message notifies ONU 200 of registration put on hold.

In step S85, ONU 200 changes the response OLT reception level category to "2" ("intermediate to weak"). ONU 200 transmits a response message (REG_ACK) to the OLT. The response message includes the LLID and information on registration put on hold.

Processing is then performed in accordance with the sequence shown in FIG. 14. In step S160, discovery processing in which the OLT reception level category is set to "intermediate to weak" is performed. Step S160 includes steps S161, S162, and S163. In step S161, OLT 100 sets the gain of the reception-side SOA to "intermediate to high." OLT 100 transmits a discovery gate message to give a notification about the reception level category=2 ("intermediate to weak") of OLT 100 together with mapping information.

In step S86, ONU 200 receives the discovery gate message and checks the reception level category included in the discovery gate message (the given reception level category) against the reception level category registered in ONU 200. Since the reception level category registered in ONU 200 is 2 ("intermediate to weak"), the given reception level category corresponds to the reception level category registered in the ONU. Therefore, the ONU responds to discovery processing by transmitting a registration request (REG_REQ) message. Through the registration request message, OLT 100 is notified of the ONU reception level category "2" (that is, "intermediate to weak").

In step S162, OLT 100 successfully receives the registration request message. OLT 100 evaluates whether or not ONU 200 can be registered. OLT 100 checks a frequency of correction in error correction processing. When the frequency of correction is lower than the threshold value or when recording of the frequency of correction of all the OLT reception level categories of interest is completed, an optimal category is determined (step S163).

For example, it is assumed that the frequency of correction is lower than the threshold value. OLT 100 transmits a gate message to ONU 200. In the gate message in this case, the ONU reception level category is set to "1" ("intermediate") and the OLT reception level category is set to "2" ("intermediate to weak"). The gate message further includes information for notifying ONU 200 of completion of registration.

ONU 200 receives the gate message and transmits a response message (REG_ACK) including the LLID and information on completion of registration to OLT 100 (step S87). The OLT reception level category "2" ("intermediate to weak") and the ONU reception level category "1" are thus registered.

In the example shown in FIGS. 13 and 14, the OLT reception level category is changed in the order of "1" and "2" and the OLT reception level category "2" is fixed as the optimal category. After the OLT reception level category is changed from "1" to "2", however, it may also be changed back to "1". In this case, the OLT reception level category "1" is fixed as the optimal category. Such a sequence will be described with reference to FIGS. 15 and 16.

Figure 15:
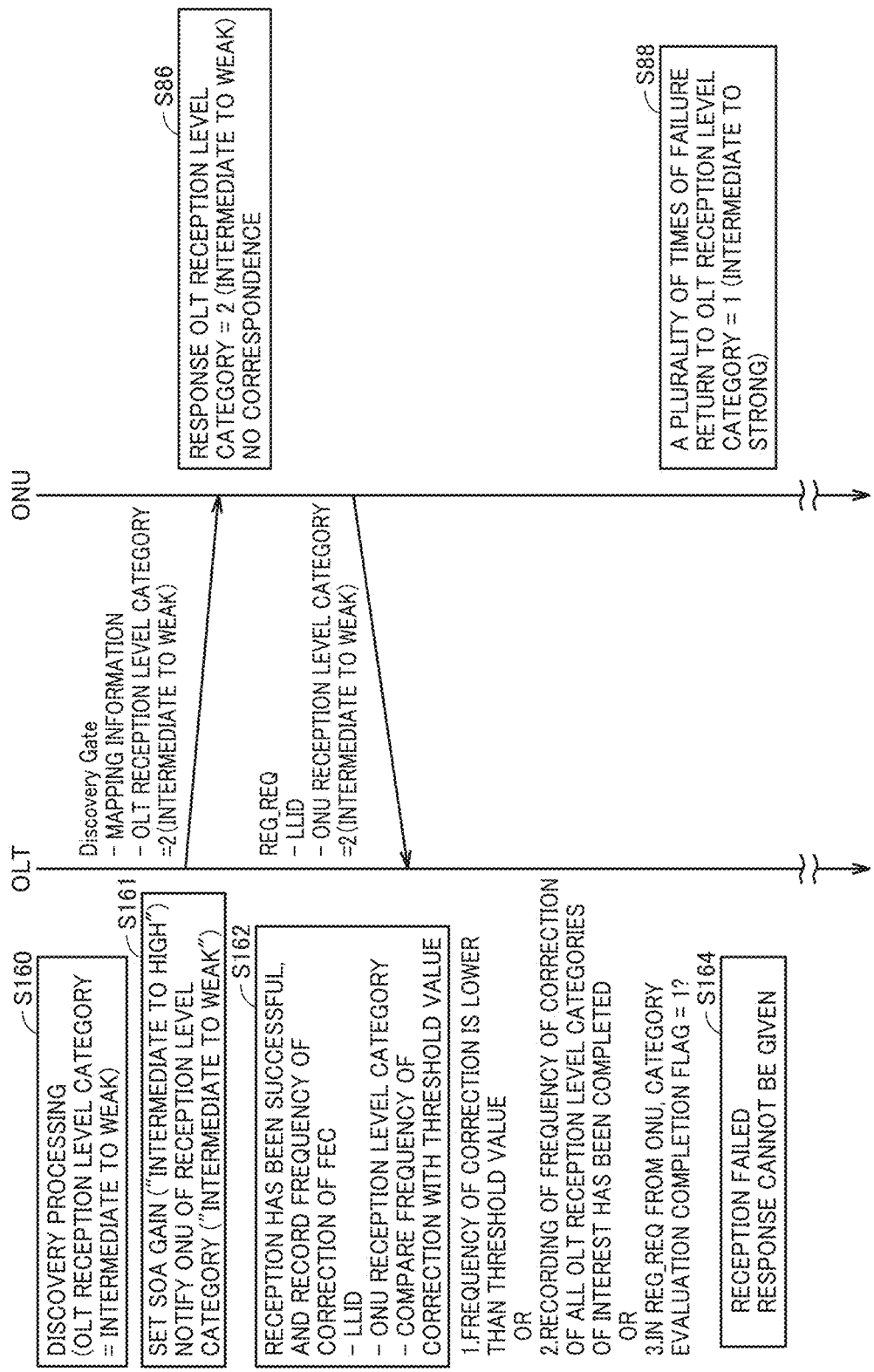
FIG. 15 is a first sequence diagram illustrating another example of discovery processing according to the third embodiment.
Figure 16:
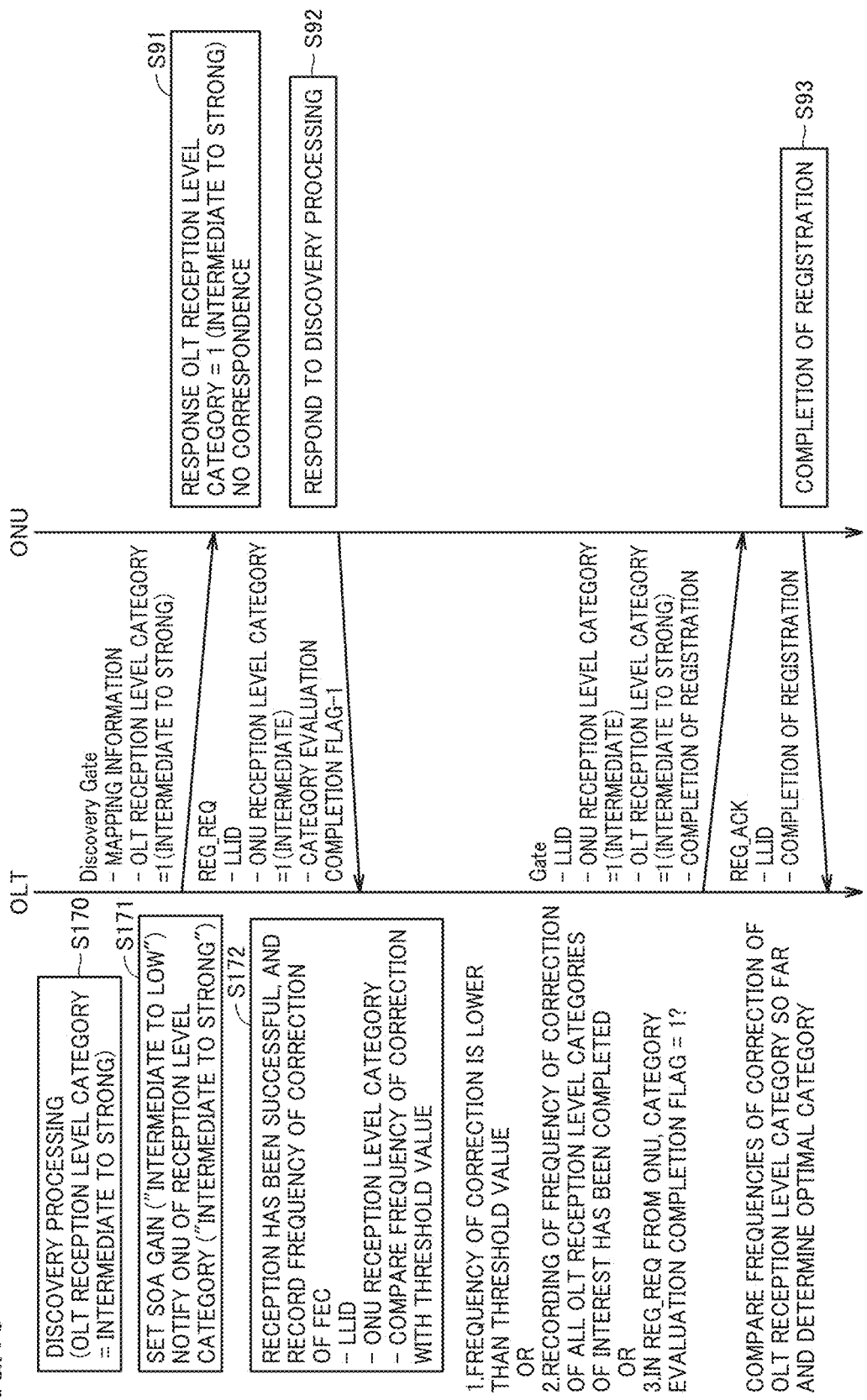
FIG. 16 is a second sequence diagram illustrating processing following the processing shown in FIG. 15.

FIG. 15 is a first sequence diagram illustrating another example of discovery processing according to the third embodiment. FIG. 16 is a second sequence diagram illustrating processing following the processing shown in FIG. 15. Processing in steps S160, S161, and S162 (on the side of OLT 100) shown in FIG. 15 and processing in step S86 (on the side of ONU 200) are the same as in the processing shown in FIG. 14. In step S162, whether or not ONU 200 can be registered is evaluated. When the frequency of correction in error correction processing is lower than the threshold value, when recording of the frequency of correction of all the OLT reception level categories of interest is completed, or when a flag indicating completion of evaluation of the category is set (category evaluation completion flag="1") in a registration request (REG_REQ) of ONU 200, an optimal category is determined. The category evaluation completion flag of ONU 200 is a flag for distinction from first category evaluation processing and given to OLT 100.

In the sequence shown in FIG. 15, though the OLT reception level category is changed, failure in returning to OLT 100, a message of response to a discovery notification from ONU 200 successively occurs. In other words, reception by OLT 100 fails (step S164).

When reception by the OLT fails consecutively a plurality of times (for example, five times), ONU 200 sets the OLT reception level category back to "1" ("intermediate to strong") (step S88). For distinction from first category evaluation processing, ONU 200 gives OLT 100 the category evaluation completion flag.

Referring to FIG. 16, in step S170, discovery processing in which the OLT reception level category is set to "intermediate to strong" is performed. Step S170 includes steps S171 and S172. In step S171, OLT 100 sets the gain of the reception-side SOA to "intermediate to low." OLT 100 transmits a discovery gate message to give a notification about the reception level category=1 ("intermediate to strong") of OLT 100 together with mapping information.

In step S91, ONU 200 receives the discovery gate message. The given reception level category corresponds to the reception level category registered in ONU 200. Therefore, in step S92, ONU 200 responds to discovery processing by transmitting a registration request (REG_REQ) message.

In step S172, OLT 100 successfully receives the registration request message. OLT 100 evaluates whether or not ONU 200 can be registered. OLT 100 checks a frequency of correction in error correction processing. When the frequency of correction is lower than the threshold value, when recording of the frequency of correction of all the OLT reception level categories of interest is completed, or when a flag indicating completion of evaluation of the category is set (category evaluation completion flag="1"), an optimal category is determined.

Since the flag indicating completion of evaluation of the category has been set, the optimal category is determined based on comparison of the frequencies of correction of the OLT reception level category so far. Since ONU 200 has responded with the completion flag being set, OLT 100 selects an optimal category from among categories from which the frequency of correction has been obtained. In other words, the optimal category is determined from the reception level categories "1" and "2" of OLT 100. In this case, the reception level category="2" of OLT 100 is the optimal category. OLT 100 transmits a gate message to ONU 200. The gate message in this case includes the ONU reception level category "1" ("intermediate") and the OLT reception level category "1" ("intermediate to strong"). Furthermore, the gate message notifies the ONU of completion of registration. ONU 200 transmits a response message (REG_ACK) including the LLID and information on completion of registration to OLT 100 (step S93). The OLT reception level category "1" ("intermediate to strong") and the ONU reception level category "1" are thus registered and registration is completed.

Reception may fail in OLT 100 in spite of setting of the OLT reception level category back to the category under which the OLT previously succeeded in reception. In such a case, processing for setting the category back within a range of remaining categories of interest is continued.

ONU 200 responds to discovery including the corresponding OLT reception level category based on information given from OLT 100 (mapping information illustrated in FIG. 11). As in the second embodiment, ONU 200 evaluates the OLT reception level category in the order of "strong", "intermediate to strong," "intermediate to weak," and "weak". In other words, the ONU reception level category is initially set to "strong". Since the ONU attempts to respond to the discovery notification in the ascending order of the SOA gain, possibility of damage to a receiver of OLT 100 by light from the ONU can be lowered.

FIG. 17 is a diagram showing another example of mapping information according to the third embodiment. As compared with the mapping information shown in FIG. 11, the ONU reception level is categorized into a larger number of categories. For example, mapping information can be set in accordance with a characteristic of the SOA. In the example in FIG. 17, the ONU reception level is categorized into eight categories from "0" to "7". Each of the ONU reception level categories from "0" to "4" is associated with the OLT reception level category "3".

Fourth Embodiment

Figure 18:
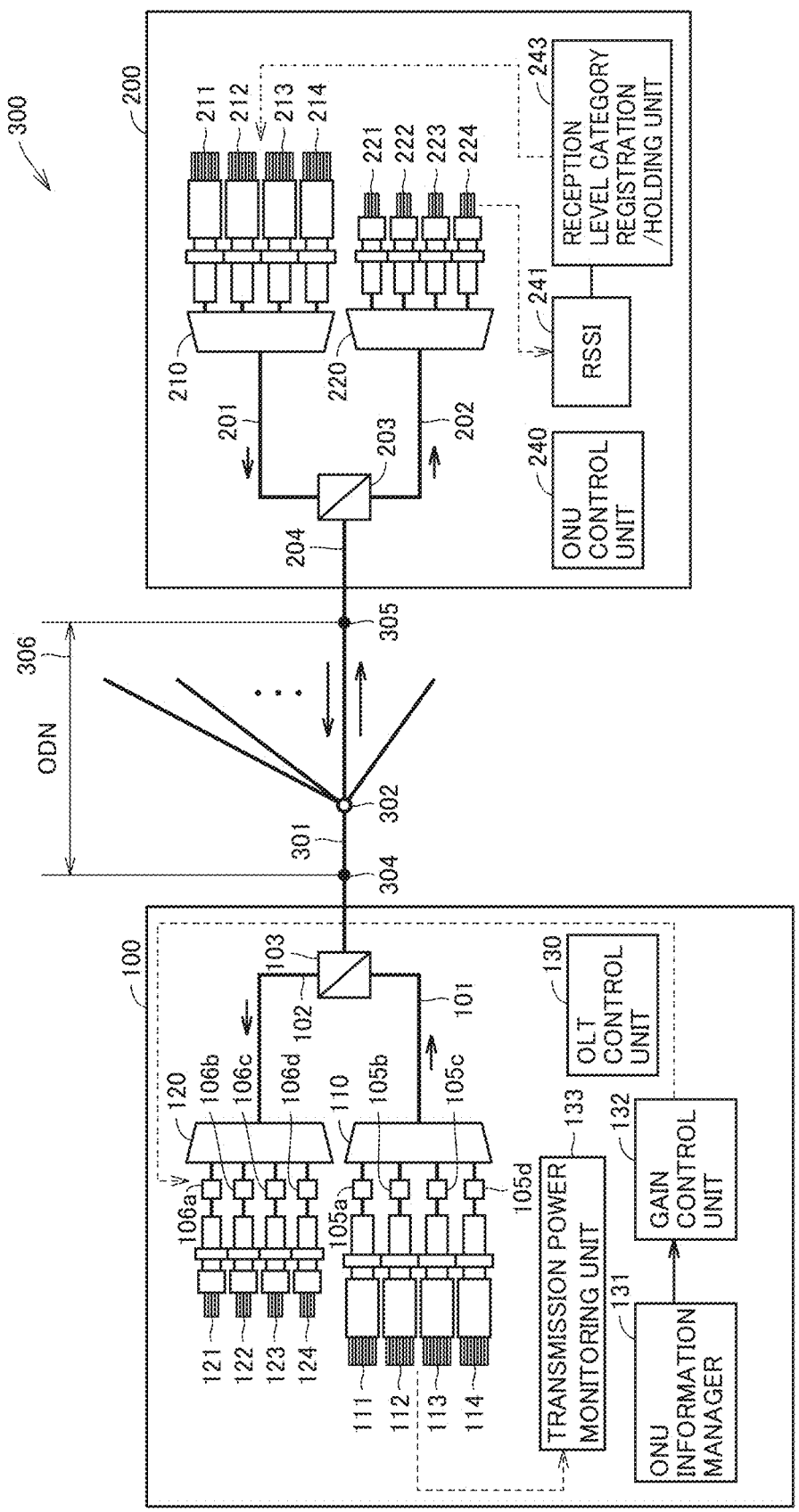
FIG. 18 is a diagram showing an exemplary configuration of the optical communication system according to a fourth embodiment.

FIG. 18 is a diagram showing an exemplary configuration of the optical communication system according to a fourth embodiment. The fourth embodiment is different from the first embodiment in configuration of OLT 100. As shown in FIG. 18, a transmission power monitoring unit 133 is added to OLT 100. Transmission power monitoring unit 133 is a circuit that monitors intensity of an optical signal (transmission signal intensity) transmitted from OLT 100. OLT 100 is otherwise the same in corresponding configuration as shown in FIG. 1.

OLT_Rx_Pow represents reception power of OLT 100 and ONU_Rx_Pow represents reception power of ONU 200. A value of ONU_Rx_Pow is detected by RSSI circuit 241.

In the first to third embodiments, the reception level category of ONU 200 is set based on reception power (ONU_Rx_Pow) of ONU 200. In the first to third embodiments, the reception level category of OLT 100 is estimated based on the reception level category of ONU 200 and the gain of the SOA is controlled based on the estimated reception level category. According to the first to third embodiments, OLT 100 can directly know the reception level of ONU 200 from reception power of ONU 200.

Reception power (ONU_Rx_Pow) of ONU 200 can be monitored by RSSI circuit 241, for example, as shown in FIG. 1. Such control is based on relation of OLT_Rx_Pow=ONU_Rx_Pow+A (A being a constant). Therefore, reception power of OLT 100 can be estimated from ONU_Rx_Pow.

In the fourth embodiment, the reception level category of ONU 200 is set based on line loss of the optical fiber. When OLT_Tx_Pow represents transmission power of OLT 100, ONU_Tx_Pow represents transmission power of ONU 200, and Loss represents line loss between OLT 100 and ONU 200, relation below is satisfied. Upstream line loss may be different from downstream line loss depending on an upstream wavelength and a downstream wavelength. For the sake of ease in understanding, however, line loss is assumed as being the same between upstream and downstream in the description below.

$$\text{Loss}=\text{OLT\_Tx\_Pow}-\text{ONU\_Rx\_Pow} \quad (1)$$

$$\text{OLT\_Rx\_Pow}=\text{ONU\_Tx\_Pow}-\text{Loss} \quad (2)$$

The expression (1) expresses that line loss Loss corresponds to a difference between transmission power of OLT 100 and reception power of ONU 200. The expression (2) expresses that reception power of OLT 100 corresponds to a difference between transmission power of ONU 200 and line loss.

OLT_Tx_Pow is assumed as being substantially constant. As is understood from the expression (1), as line loss is higher, reception power of ONU 200 is lower, and as line loss is lower, reception power of ONU 200 is higher. In other words, line loss correlates with reception power of ONU 200. Therefore, the reception level category of ONU 200 can be estimated based on line loss of the optical fiber and the estimated category can be set as the reception level category of ONU 200.

An expression (3) below is established based on the expression (1) and the expression (2).

$$OLT\_Rx\_Pow = ONU\_Rx\_Pow + (ONU\_Tx\_Pow - OLT\_Tx\_Pow) \qquad (3)$$

In the first to third embodiments, (ONU_Tx_Pow−OLT_Tx_Pow) is handled as a constant A. In the fourth embodiment, RSSI circuit 241 of ONU 200 measures ONU_Rx_Pow and transmission power monitoring unit 133 of OLT 100 measures OLT_Tx_Pow. According to the fourth embodiment, accuracy in estimation of OLT_Rx_Pow can be enhanced.

Figure 19:
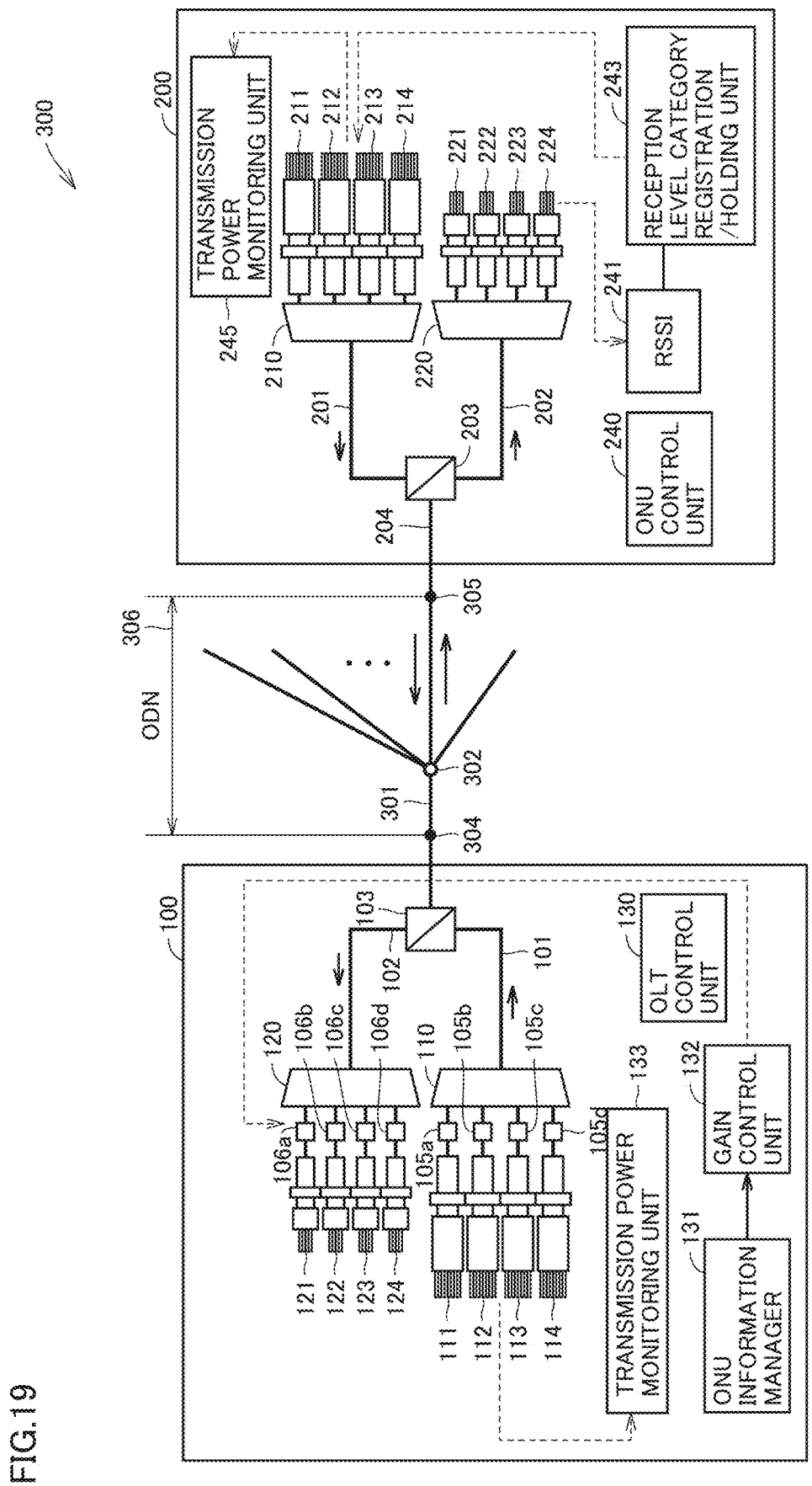
FIG. 19 is a diagram showing an exemplary configuration for measuring transmission power of the ONU according to the fourth embodiment.

ONU_Tx_Pow may have an already known value. Alternatively, as shown in FIG. 19, ONU_Tx_Pow may be measured in ONU 200. ONU 200 includes a transmission power monitoring unit 245 that measures transmission power of ONU 200.

ONU 200 transmits an optical signal by burst transmission. Therefore, until ONU 200 emits light once, transmission power monitoring unit 245 cannot be used for measurement of ONU_Tx_Pow. For using a value measured by transmission power monitoring unit 245 as a value for ONU_Tx_Pow, for example, a method below is employed. Initially, a specification value is adopted as an initial value for ONU_Tx_Pow. After emission of light by ONU 200, a value measured by transmission power monitoring unit 245 is obtained. When a difference of the measured value from the initial value is large (exceeds a threshold value), the value for ONU_Tx_Pow is switched from the initial value to the value measured by transmission power monitoring unit 245. When a difference of the measured value from the initial value is small (smaller than the threshold value), the initial value can be used as it is.

Figure 20:
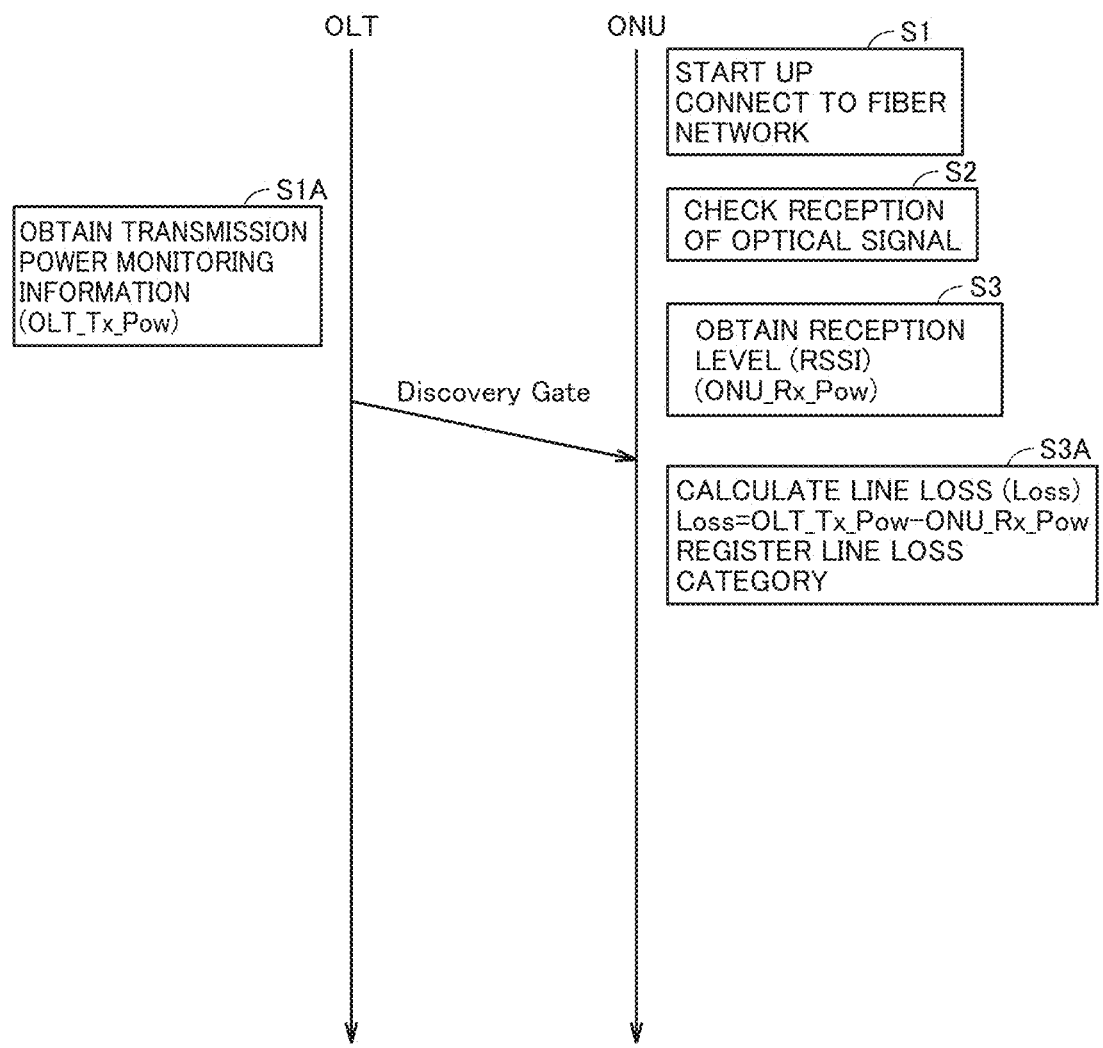
FIG. 20 is a sequence diagram illustrating exemplary processing at the time of start-up of the ONU according to the fourth embodiment.

FIG. 20 is a sequence diagram illustrating exemplary processing at the time of start-up of the ONU according to the fourth embodiment. The sequence shown in FIG. 20 is basically the same as the sequence shown in FIG. 3. The sequence shown in FIG. 20 is different from the sequence shown in FIG. 3 in the following.

In step S1A, OLT 100 obtains transmission power monitoring information, that is, a value of OLT_Tx_Pow. As shown in FIGS. 18 and 19, transmission power monitoring unit 133 obtains transmission power monitoring information by monitoring transmission power of OLT 100.

ONU 200 obtains a reception level (RSSI) in step S3. RSSI circuit 241 of ONU 200 obtains information on reception power of ONU 200, that is, the value for ONU_Rx_Pow, based on an output from the light receiver.

OLT 100 incorporates transmission power monitoring information of OLT 100 into a discovery gate message and transmits the discovery gate message. ONU 200 receives the discovery gate message.

In step S3A, ONU 200 calculates line loss (Loss) by applying the value for OLT_Tx_Pow included in the discovery gate message and the value for ONU_Rx_Pow obtained by RSSI circuit 241 to the expression (1). ONU 200 determines a category of line loss based on the calculated value and registers the category in ONU 200. Reception level category registration/holding unit 243 holds the category of line loss as the reception level category.

Figure 21:
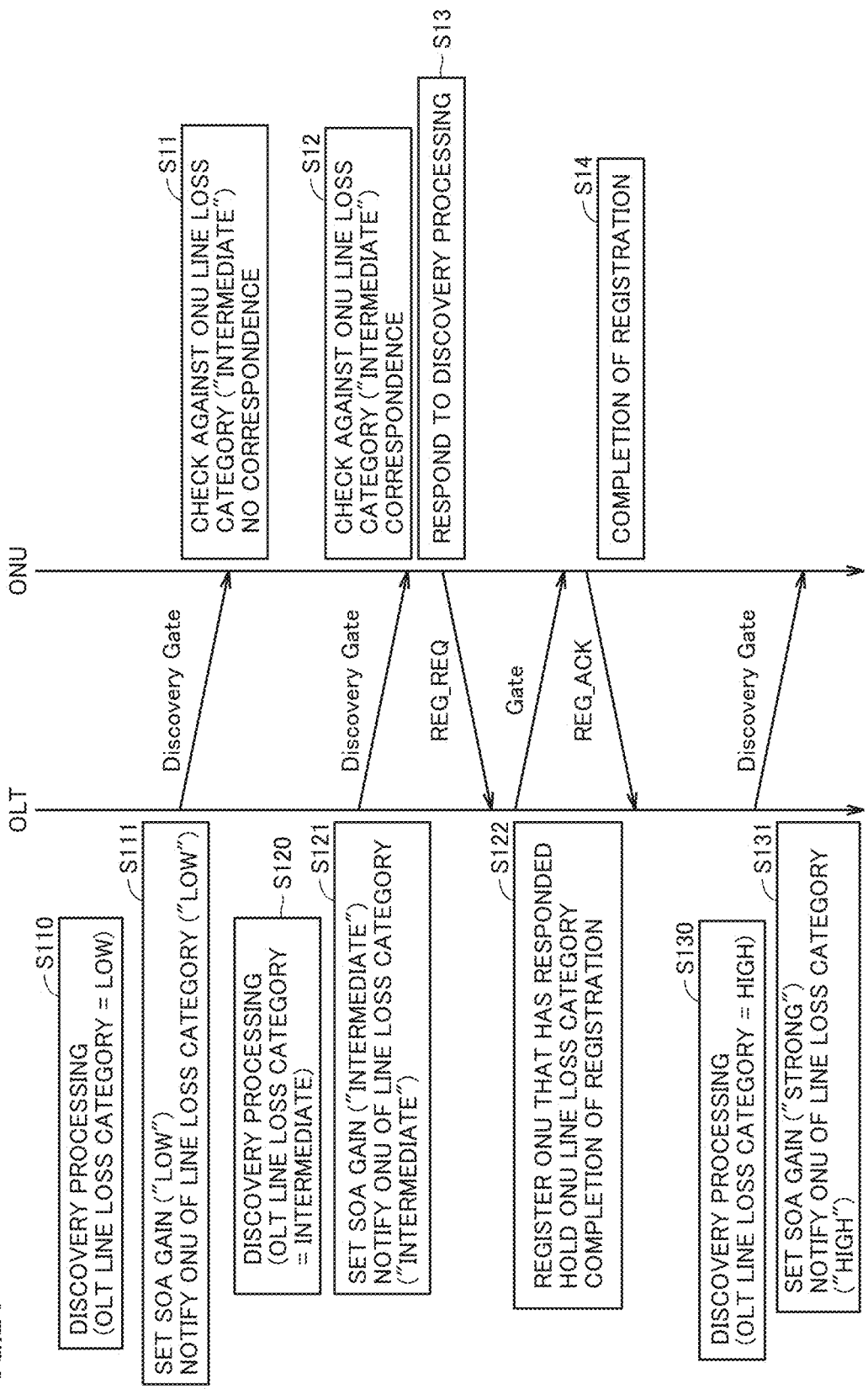
FIG. 21 is a sequence diagram illustrating one example of discovery processing according to the fourth embodiment.

FIG. 21 is a sequence diagram illustrating one example of discovery processing according to the fourth embodiment. Though the sequence shown in FIG. 21 is basically the same as the sequence shown in FIG. 4, the term "reception level category" is replaced with a "line loss category."

In step S110, discovery processing in which the line loss category on the side of OLT 100 is set to "low" is performed. When line loss is low, power of an optical signal input to OLT 100 may be high. Then, in step S111, OLT 100 sets the gain of the reception-side SOA to "low". OLT 100 transmits a discovery gate message to give a notification about the line loss category ("low") of OLT 100.

In step S11, ONU 200 (an unregistered ONU) receives the discovery gate message. ONU 200 checks the line loss category included in the discovery gate message (the given reception level category) against the line loss category registered in ONU 200. Since the line loss category registered in ONU 200 is "intermediate", the given line loss category does not correspond to the line loss category registered in ONU 200. Therefore, ONU 200 does not respond to the discovery gate message.

In step S120, discovery processing in which the OLT line loss category is set to "intermediate" is performed. In step S121, OLT 100 sets the gain of the reception-side SOA to "intermediate". OLT 100 transmits a discovery gate message to give a notification about the line loss category ("intermediate") of OLT 100.

In step S12, ONU 200 receives the discovery gate message. ONU 200 checks the line loss category included in the discovery gate message against the line loss category registered in ONU 200. The given line loss category corresponds to the line loss category registered in ONU 200. Therefore, in step S13, ONU 200 responds to the discovery gate message. Subsequent processing for registering ONU 200 is similar to the processing shown in FIG. 4. In step S122, ONU information manager 131 of OLT 100 registers information on the line loss category of an ONU (ONU 200) that has responded to the discovery gate message.

In succession, in step S130, discovery processing in which the OLT line loss category is set to "high" is performed. In step S131, OLT 100 sets the gain of the reception-side SOA to "strong". OLT 100 transmits a discovery gate message to give a notification about the line loss category ("high") of OLT 100.

As is understood from the first to fourth embodiments, information necessary for determining the reception level category of the ONU is not limited to specific information. Information directly indicating intensity of an optical signal received by the ONU may be applicable, and the reception level category of the ONU can be determined in the embodiments of the present invention based on any information allowing estimation of intensity of an optical signal received by the ONU. Thus, not only the OLT can guarantee gain control in reception of an optical signal from an ONU but also the OLT can register the ONU.

The reception level category may be set based on line loss in a modification of each of the first to third embodiments. In this case, the "line loss category" can be employed as the "reception level category" in each of the first to third embodiments. The category "strong" of the "reception level category" is replaced with the category "low" of the "line loss category" and the category "weak" of the "reception level category" is replaced with the category "high" of the "line loss category."

Fifth Embodiment

An optical communication system according to a fifth embodiment can be configured similarly to the configuration shown in any of FIGS. 1, 7, 18, and 19.

In the fifth embodiment, the reception level category of the ONU is defined by a range of the reception level (RSSI) of the ONU. Therefore, the reception level category of the ONU has a maximum value of the reception level and a minimum value of the reception level.

Figure 22:
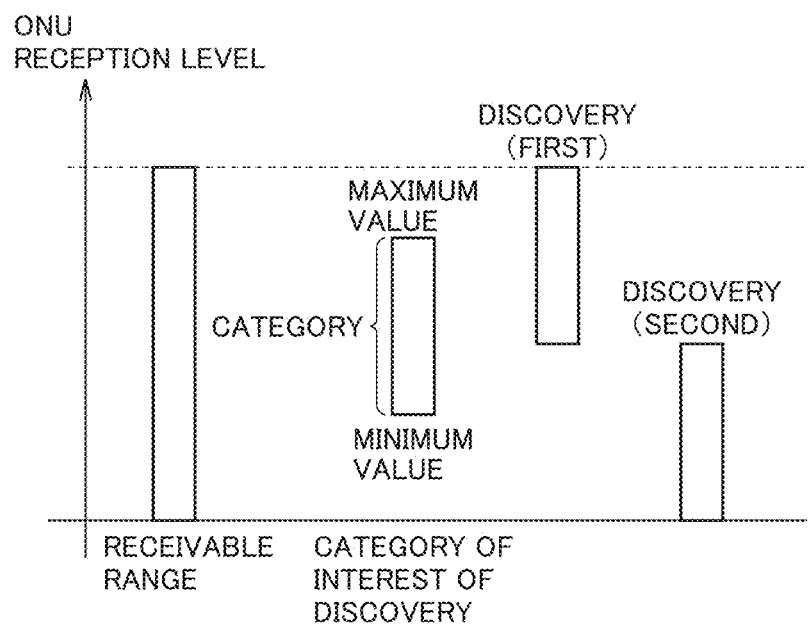
FIG. 22 is a diagram showing setting of a reception level category of the ONU according to a fifth embodiment.

FIG. 22 is a diagram showing setting of the reception level category of the ONU according to the fifth embodiment. As shown in FIG. 22, the maximum value and the minimum value are set within a range of the reception level of the ONU. The maximum value of the reception level and the minimum value of the reception level set the reception level category of interest in discovery processing.

The maximum value and the minimum value of the reception level category of the ONU are both variable. In the example shown in FIG. 22, the number of reception level categories is set to one and the maximum value and the minimum value of the reception level category are variable. FIG. 22 shows an example in which the maximum value and the minimum value are simultaneously changed. Any one of the maximum value and the minimum value, however, may be changed. A range of the reception level for one reception level category can arbitrarily be set.

The reception level category of the ONU is set by OLT 100. Specifically, OLT 100 incorporates the maximum value and the minimum value of the reception level category into a discovery gate message. Therefore, ONU 200 is notified of the maximum value and the minimum value of the reception level category from OLT 100 through a discovery gate message.

Figure 23:
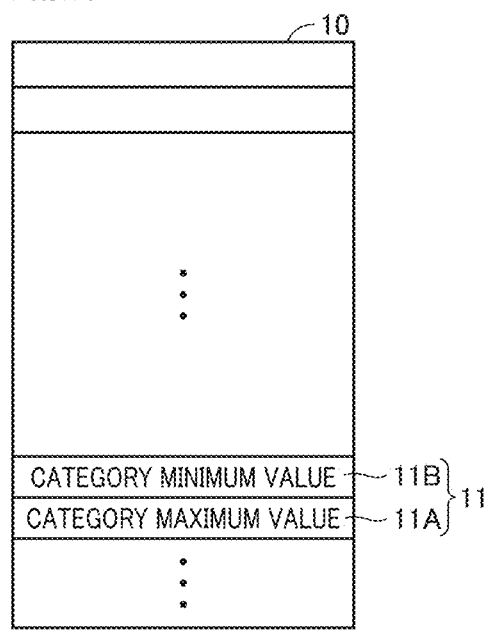
FIG. 23 is a schematic diagram showing an exemplary discovery message according to the fifth embodiment.

FIG. 23 is a schematic diagram showing an exemplary discovery message according to the fifth embodiment. As shown in FIG. 23, discovery gate message 10 can include a category maximum value 11A and a category minimum value 11B as its items. Category maximum value 11A and category minimum value 11B correspond to OLT reception level category 11 according to the first embodiment.

When ONU 200 is started up, ONU 200 monitors a reception level of ONU 200 itself. In performing discovery processing, ONU 200 receives a discovery gate message from OLT 100. ONU 200 compares category maximum value 11A and category minimum value 11B given through the discovery gate message with the reception level of ONU 200. When the reception level of ONU 200 lies between category maximum value 11A and category minimum value 11B, ONU 200 responds to the discovery gate message. OLT 100 registers ONU 200 based on the response from ONU 200. Therefore, as in the first embodiment, OLT 100 can register the optical network unit corresponding to the reception level category in discovery processing.

Figure 24:
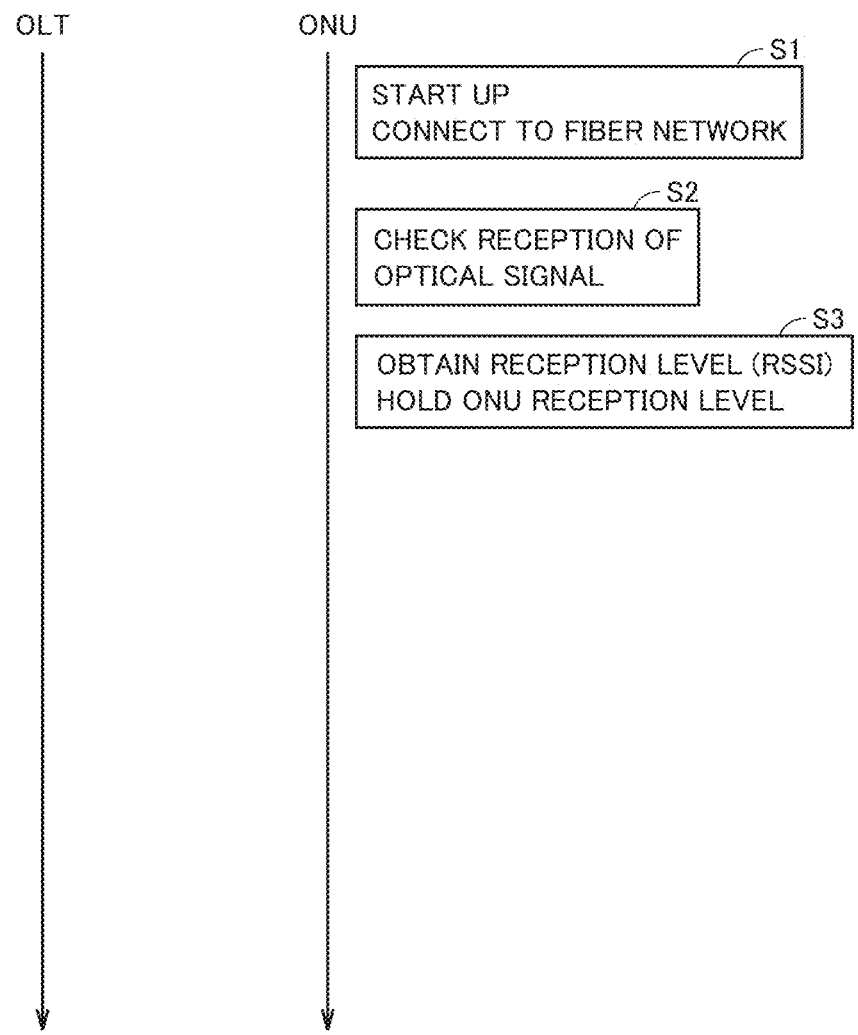
FIG. 24 is a sequence diagram showing exemplary processing at the time of start-up of the ONU according to the fifth embodiment.

FIG. 24 is a sequence diagram showing exemplary processing at the time of start-up of the ONU according to the fifth embodiment. In step S1, ONU 200 is started up by turning on the power of ONU 200. ONU 200 is thus connected to an optical fiber network. In step S2, ONU 200 checks reception of an optical signal. In step S3, ONU 200 measures the reception level. RSSI circuit 241 obtains the reception level (RSSI) based on output from the light receiver. Reception level category registration/holding unit 243 holds a value of the reception level (measured value).

Figure 25:
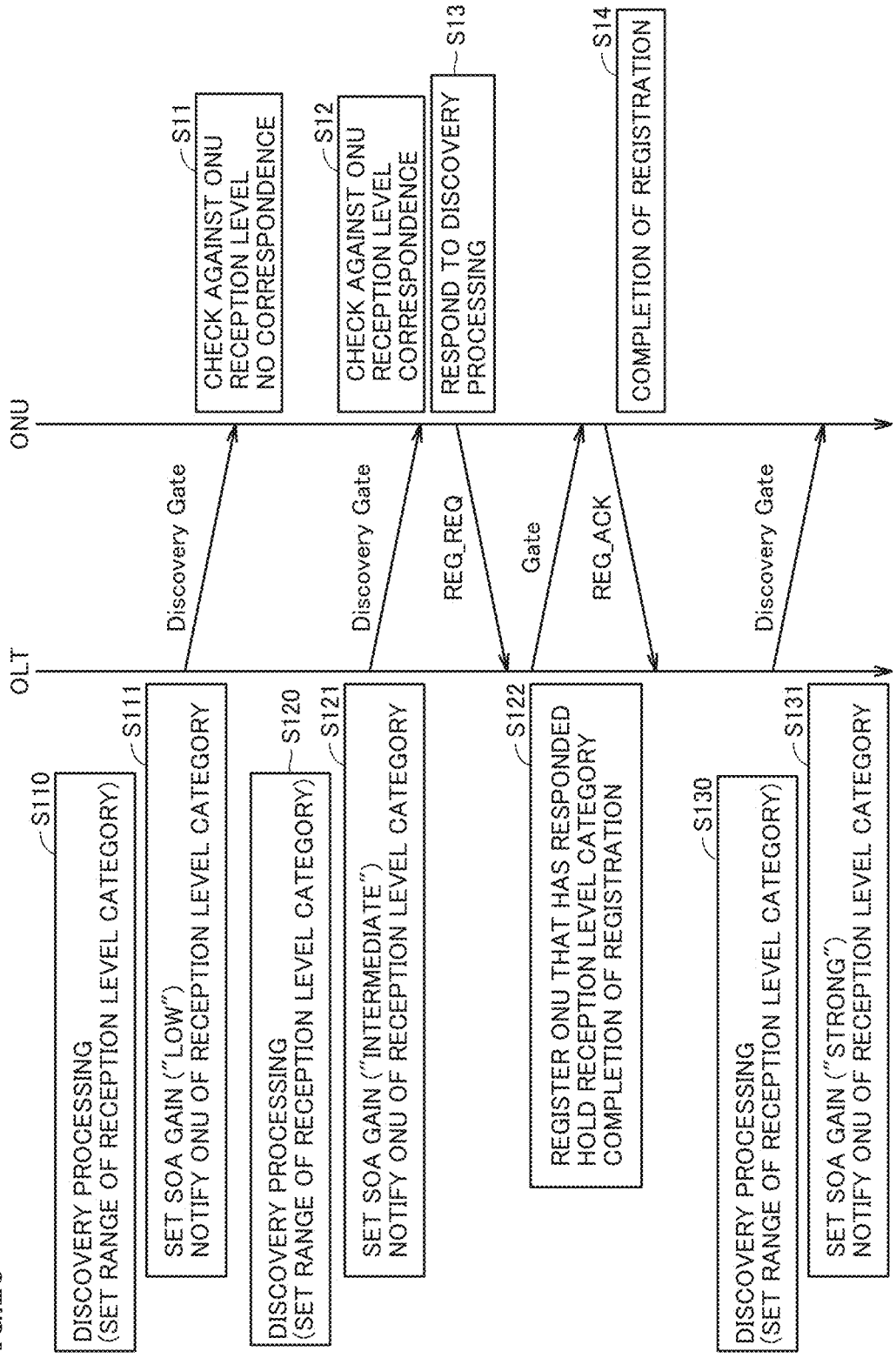
FIG. 25 is a sequence diagram illustrating one example of discovery processing according to the fifth embodiment.

FIG. 25 is a sequence diagram illustrating one example of discovery processing according to the fifth embodiment. The sequence shown in FIG. 25 is basically the same as the sequence shown in FIG. 4. In the fifth embodiment, a range of the reception level is changed by OLT 100. In the example shown in FIG. 25, the reception level of ONU 200 is assumed as a level corresponding to the reception level category "intermediate" in the first embodiment.

In step S110, a range of the OLT reception level category is set. The OLT reception level category corresponds to "strong" in the first embodiment. In step S111, OLT 100 sets the gain of the reception-side SOA to "low". OLT 100 notifies ONU 200 of the reception level category through a discovery gate. A discovery gate message includes category maximum value 11A and category minimum value 11B as described above.

In step S11, ONU 200 checks a measured value of the reception level (see FIG. 24) of ONU 200 against the reception level category given from OLT 100. When the reception level of ONU 200 is out of the range corresponding to the reception level category, the reception level of ONU 200 does not correspond to the reception level category given by OLT 100. Therefore, ONU 200 does not respond to the discovery gate message.

In step S120, OLT 100 sets the range of the reception level category. The reception level category set in step S120 corresponds to the reception level category "intermediate" in the first embodiment. In step S121, OLT 100 sets the gain of the reception-side SOA to "intermediate". OLT 100 notifies ONU 200 of the reception level category through a discovery gate.

In step S12, ONU 200 receives the discovery gate message. ONU 200 checks the reception level (see FIG. 24) of ONU 200 against the reception level category given from OLT 100. Since the reception level of ONU 200 lies within the range corresponding to the reception level category, the reception level of ONU 200 corresponds to the reception level category given by OLT 100. Therefore, in step S13, ONU 200 responds to the discovery gate message.

In step S13, ONU 200 transmits a registration request (REG_REQ) to OLT 100. In step S122, OLT 100 registers an ONU (ONU 200) that has responded to the discovery gate message. OLT 100 transmits a gate (Gate) message for notifying ONU 200 of a transmission band and transmission timing. In step S14, ONU 200 transmits acknowledgement (REG_ACK) of a registration message (Register) to OLT 100. Registration is thus completed.

In step S130, OLT 100 sets a range of the reception level category. The reception level category set in step S130 corresponds to the reception level category "weak" in the first embodiment. In step S131, OLT 100 sets the gain of the reception-side SOA to "strong". OLT 100 notifies ONU 200 of the reception level category through a discovery gate message.

In the fifth embodiment, a method of determining the maximum value and the minimum value of the reception level category is not particularly limited. The maximum value and the minimum value may be determined in advance. In one embodiment, the reception level category can be set based on line loss of an optical fiber as in the fourth embodiment. In that case, the category maximum value and the category minimum value can be set based on line loss of an optical fiber. A difference between transmission power of OLT 100 and reception power of ONU 200 may be defined as line loss of an optical fiber.

Sixth Embodiment

In a sixth embodiment, a plurality of (for example, two) reception level categories are brought in correspondence with an ONU reception level. The ONU attempts to give discovery response in the ascending order of the SOA gain, that is, in the descending order of the reception level category.

Figure 26:
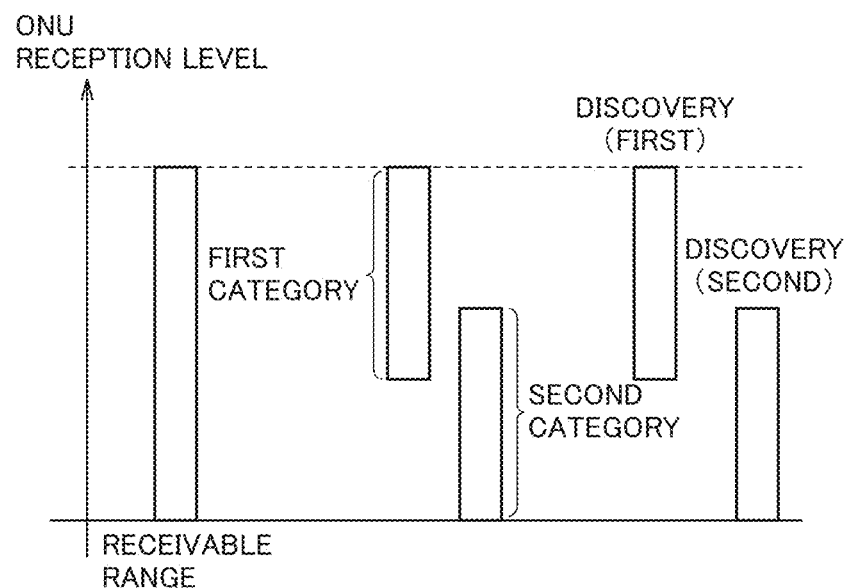
FIG. 26 is a diagram showing setting of a reception level category of the ONU according to a sixth embodiment.

FIG. 26 is a diagram showing setting of a reception level category of the ONU according to the sixth embodiment. As in the fifth embodiment, the maximum value of the reception level and the minimum value of the reception level are set within a range of the reception level of the ONU. The reception level category is thus set.

FIG. 26 illustrates a first category and a second category. OLT 100 changes the reception level category from the first category to the second category. For example, in first discovery processing, the reception level category is set to the first category, and in second discovery processing, the reception level category is set to the second category. A range of the first category and a range of the second category overlap with each other.

Figure 27:
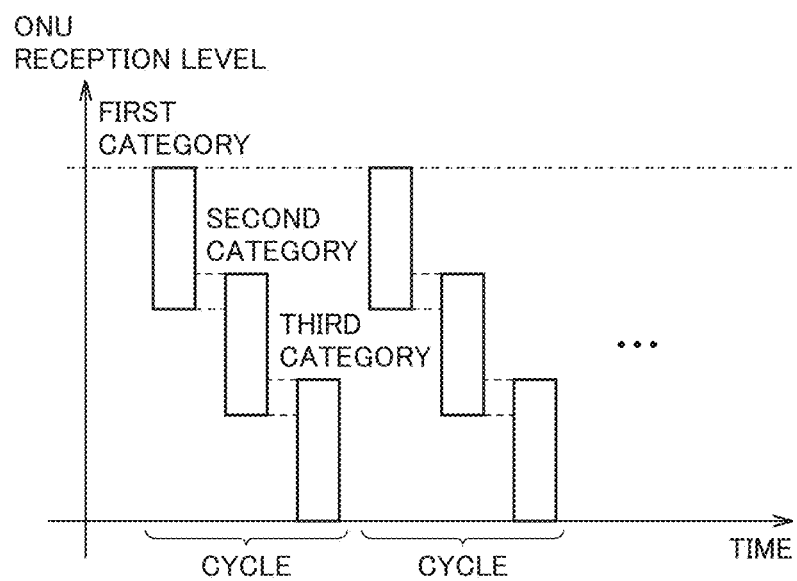
FIG. 27 is a schematic diagram for illustrating discovery processing according to the sixth embodiment.

FIG. 27 is a schematic diagram for illustrating discovery processing according to the sixth embodiment. As shown in FIG. 27, the reception level category is set repeatedly in the order of the first category, the second category, and a third category. The reception level category may sequentially be switched among the first category, the second category, and the third category in one cycle. The maximum value of the first category is greater than the maximum value of the second category. The maximum value of the second category is greater than the maximum value of the third category. The reception level category is set such that the reception level is changed from the higher level to the lower level. In this case, the SOA gain is switched from a lower gain to a higher gain.

The first category and the second category overlap with each other. Similarly, the second category and the third category overlap with each other. Therefore, the maximum value of the second category is greater than the minimum value of the first category. Furthermore, the maximum value of the third category is greater than the minimum value of the second category. The minimum value of the first category is greater than the maximum value of the third category. Therefore, the first category and the third category do not overlap with each other.

Figures 28, 29:
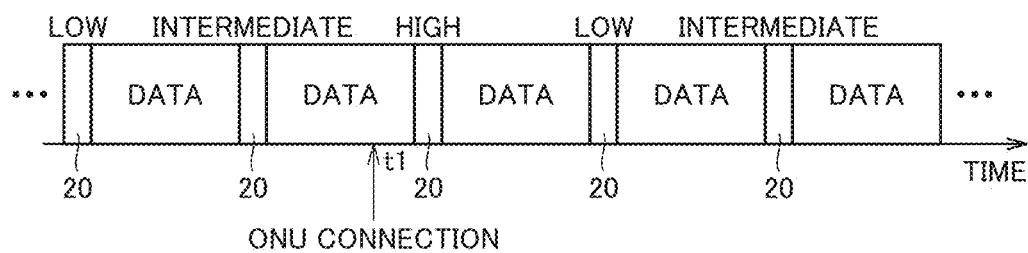
FIG. 28 is a diagram for illustrating determination of a reception level category of the ONU by the OLT.
FIG. 29 is a diagram showing relation between discovery processing and an SOA gain.

FIG. 28 is a diagram for illustrating determination of the reception level category of the ONU by the OLT. "Yes" in FIG. 28 means that the ONU reception level corresponds to a category set by the OLT. "No" means that the ONU reception level does not correspond to the category.

Referring to FIGS. 27 and 28, when the ONU reception level corresponds to the first category while it does not correspond to the second and third categories, the reception level category is set to the first category.

When the ONU reception level corresponds to the first category and the second category while it does not correspond to the third category, the ONU reception level is within a range where the first category and the second category overlap with each other. ONU 200 responds to OLT 100 in discovery processing when the category higher in reception level is set. In this case, ONU 200 responds to OLT 100 in discovery processing when the first category is set. Therefore, the reception level category is set to the first category.

When the ONU reception level corresponds to the second category while it does not correspond to the first category and the third category, the reception level category is set to the second category.

When the ONU reception level corresponds to the second category and the third category while it does not correspond to the first category, the ONU reception level is within a range where the second category and the third category overlap with each other. ONU 200 responds to OLT 100 in discovery processing when a category higher in reception level is set. Therefore, the reception level category is set to the second category.

When the ONU reception level corresponds to the third category while it does not correspond to the first category and the second category, the reception level category is set to the third category.

Whether or not the ONU reception level corresponds to each of the first to third categories can be determined within one cycle described above.

In the sixth embodiment, the reception level category is determined by the maximum value and the minimum value of the reception level. Therefore, instead of setting the reception level a plurality of times, the maximum value and the minimum value may be set a plurality of times. For example, instead of the first to third categories, three sets of the maximum value and the minimum value can be set. The first set, the second set, and the third set correspond to the first to third categories, respectively. Therefore, the maximum value of the second set may be greater than the minimum value of the first set and the maximum value of the third set may be greater than the minimum value of the second set.

In monitoring of the reception level in the ONU, there may be an error in the reception level or the reception level may be varied. According to the sixth embodiment, even in such a case, possibility that the ONU is not registered can be lowered.

In performing discovery processing, the ONU may be notified of the reception level category in the descending order of the maximum value. In reception of an optical signal in OLT 100, damage to OLT 100 (damage to the SOA or the APD) can be lessened.

Seventh Embodiment

In a seventh embodiment, the OLT registers a level of the gain in a reception unit of the OLT in correspondence with each ONU. The ONU determines whether or not to respond to a discovery message independently of the reception level category of the ONU itself. The ONU may measure a reception level of the ONU itself. In the seventh embodiment, however, measurement of the reception level is not essential for discovery processing. Occurrence of a defect of a reception function on the side of the ONU may lead to lowering in accuracy of the level of reception of an optical signal in the ONU or failure of the reception function. Since the reception level measured by the ONU is not essential for discovery processing, such a problem can be solved.

FIG. 29 is a diagram showing relation between discovery processing and an SOA gain. OLT 100 opens a time window (a discovery window 20) for discovery processing in constant cycles. OLT 100 switches the gain of the SOA each time it opens discovery window 20. The gain of the SOA is changed from a lower gain to a higher gain.

FIG. 29 shows an example in which the gain of the SOA is categorized into three levels (low, intermediate, and high). The reception level category of the OLT is changed in the order of strong, intermediate, and weak. Therefore, the level of the gain of the SOA is repeatedly changed to low, intermediate, high, low, intermediate, . . . .

An unregistered ONU can transmit a registration request (Register request) each time OLT 100 transmits a discovery gate message. The ONU, however, is not aware of the reception level of the ONU itself.

For example, it is assumed that one ONU is connected to a PON line at timing t1. When a distance between the ONU and OLT 100 is short, power of an optical signal received by OLT 100 from that ONU is high. In a discovery window next to timing t1, the level of the gain of the SOA is high. Therefore, the light receiver of OLT 100 may be damaged by response of the ONU to a discovery gate.

Figure 30:
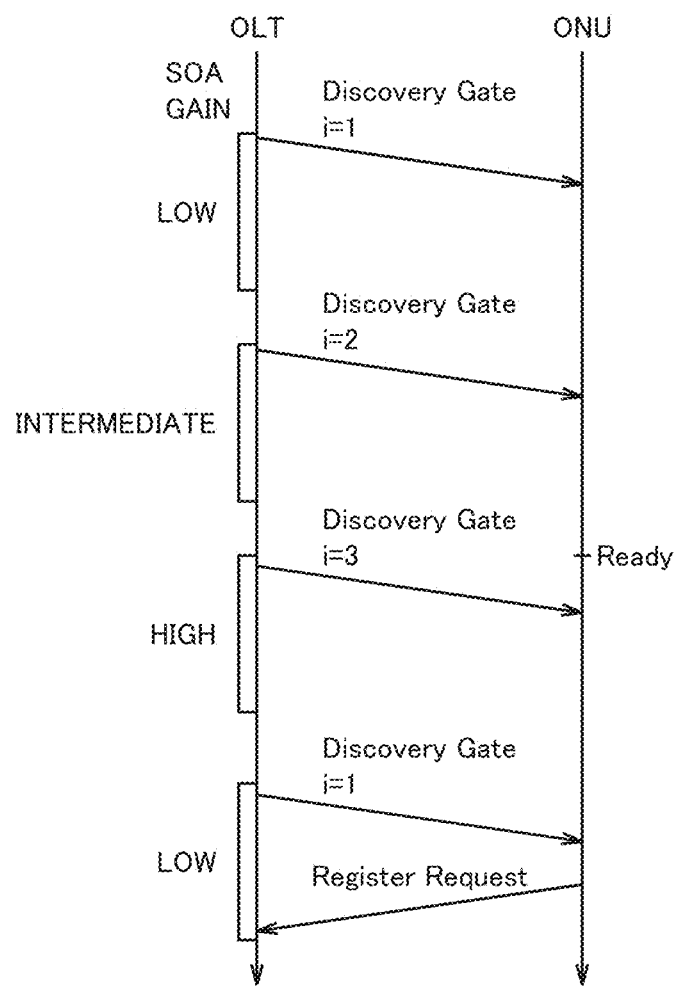
FIG. 30 is a sequence diagram illustrating one example of discovery processing according to a seventh embodiment.

FIG. 30 is a sequence diagram illustrating one example of discovery processing according to the seventh embodiment. As shown in FIG. 30, OLT 100 incorporates an identification number i in accordance with a gain level of the SOA into a discovery gate message. For example, i=1, 2, and 3 represents the level of the SOA gain (gain category) being LV1 (low), LV2 (intermediate), and LV3 (high), respectively. Identification number i may be a number in accordance with the reception level category of the OLT. In this case, i=1, 2, and 3 represents the reception level category of the OLT being strong, intermediate, and weak, respectively.

The ONU can transmit a registration request in response to all discovery gate messages. In this embodiment, an unregistered ONU (ONU 200) starts transmission of a registration request when a condition of i=1 is satisfied without fail. For example, it is assumed that ONU 200 is Ready at timing immediately before the level of the SOA gain attains to LV3 (high). In the discovery gate message received first by ONU 200, a condition of i=3 is set. Therefore, ONU 200 is unable to respond to the discovery gate message. ONU 200 cannot transmit a registration request (Register request) until the condition of i=1 is satisfied. OLT 100 can acknowledge response from ONU 200. Therefore, OLT 100 registers ONU 200 and sets a gain category (gain level LV1 (low)) for ONU 200.

OLT 100 registers identification number i at the time of normal reception of Register request for each ONU. OLT 100 registers each ONU with each ONU and identification number i being associated with each other. In other words, OLT 100 registers the gain category of the SOA for each registered ONU. After the ONU is registered in OLT 100, OLT 100 sets the gain in accordance with the value of registered identification number i in communicating with that ONU.

According to the seventh embodiment, reception of an optical signal high in transmission power from the ONU with the SOA gain in OLT 100 being high can be avoided. Therefore, damage to the receiver of OLT 100 can be prevented. Furthermore, since OLT 100 can set an appropriate SOA gain for each ONU, communication with the ONU can be stabilized. Quality in communication can thus be secured.

Eighth Embodiment

As in the seventh embodiment, in an eighth embodiment, OLT 100 requests all unregistered ONUs to give a response in a discovery section without relying on measurement of the reception level on the side of the ONU. OLT 100 registers the level of the gain in the reception unit of OLT 100 in correspondence with each ONU. Collison of burst signals among a plurality of ONUs or timing of start-up of the ONU within a discovery section may lead to failure in setting, in registration of an ONU by OLT 100, of an appropriate SOA gain for that ONU. The eighth embodiment can solve such a problem.

The ONU may measure a reception level of the ONU itself. Measurement of the reception level, however, is not essential for discovery processing. Occurrence of a defect of the reception function on the side of the ONU may lead to lowering in accuracy of the level of reception of an optical signal in the ONU or failure of the reception function. Since the reception level measured by the ONU is not essential for discovery processing, such a problem can be solved.

In the eighth embodiment, change in SOA gain is repeated within a discovery section. OLT 100 thus sets the SOA gain associated with each ONU to be lower. Possibility of damage to a light receiver in OLT 100 can thus be lowered.

Figure 31:
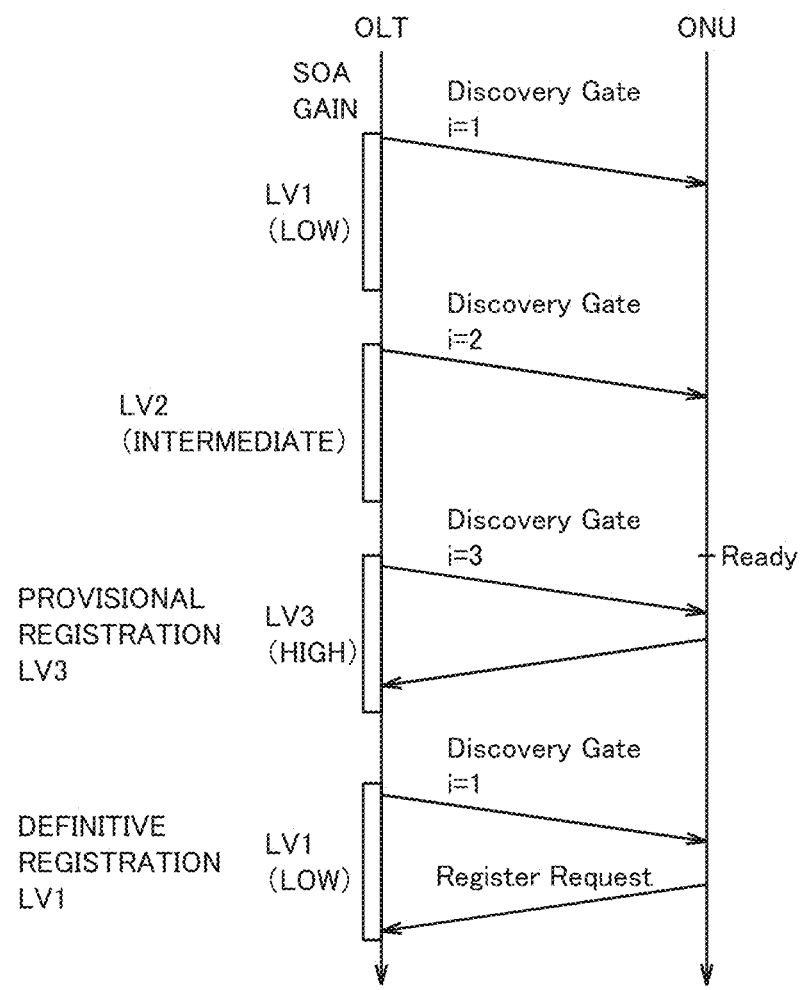
FIG. 31 is a sequence diagram illustrating one example of discovery processing according to an eighth embodiment.

FIG. 31 is a sequence diagram illustrating one example of discovery processing according to the eighth embodiment. The sequence shown in FIG. 31 is the same as the sequence shown in FIG. 30 in that the level of the gain (gain category) of the SOA is changed in the order of low, intermediate, and high.

As in the example shown in FIG. 30, it is assumed that an unregistered ONU is Ready at timing immediately before the level of the SOA gain attains to LV3 (high). Thereafter, the ONU transmits a registration request in response to a discovery gate message. Initially, the ONU transmits a registration request in response to a discovery gate message of which identification number i is set to 3. When the OLT has successfully received the registration request, OLT 100 provisionally registers LV3 as the SOA gain for the ONU.

In this case, OLT 100 determines whether or not LV1 or LV2 representing a lower SOA gain level can be registered as the SOA gain level for this ONU. The ONU transmits a registration request in response to a discovery gate message of which identification number i is set to 1. When OLT 100 has successfully received the registration request, OLT 100 updates setting of the SOA gain for the ONU. Therefore, LV1 representing a gain level lower than LV3 is definitively registered as the SOA gain level for the ONU.

It is assumed that the ONU has transmitted a registration request in response to a discovery gate message of which identification number i is 1. When OLT 100 is unable to obtain the registration request due to lower transmission power from the ONU, the SOA gain level is maintained at provisionally registered LV3. Then, the ONU transmits a registration request in response to a discovery gate message of which identification number i is 2. When OLT 100 has successfully obtained the registration request, OLT 100 registers LV2 as the SOA gain level for the ONU. Therefore, level LV2 is definitively registered.

When neither of levels LV1 and LV2 is appropriate for definitive registration, OLT 100 definitively registers LV3 as the SOA gain level for the ONU.

OLT 100 performs the same processing also when there is an ONU which has already been registered and from which response can be acknowledged at a gain lower than the registered gain. OLT 100 thus associates a lower SOA gain with the ONU. When LV1 has provisionally been registered as the gain level, level LV1 is also definitively registered as it is.

In a light receiver of OLT 100, when power of light amplified by the SOA of OLT 100 exceeds a break level of that light receiver, the gain category is set to a category at the lowest level and the gain category is set again.

Figure 32:
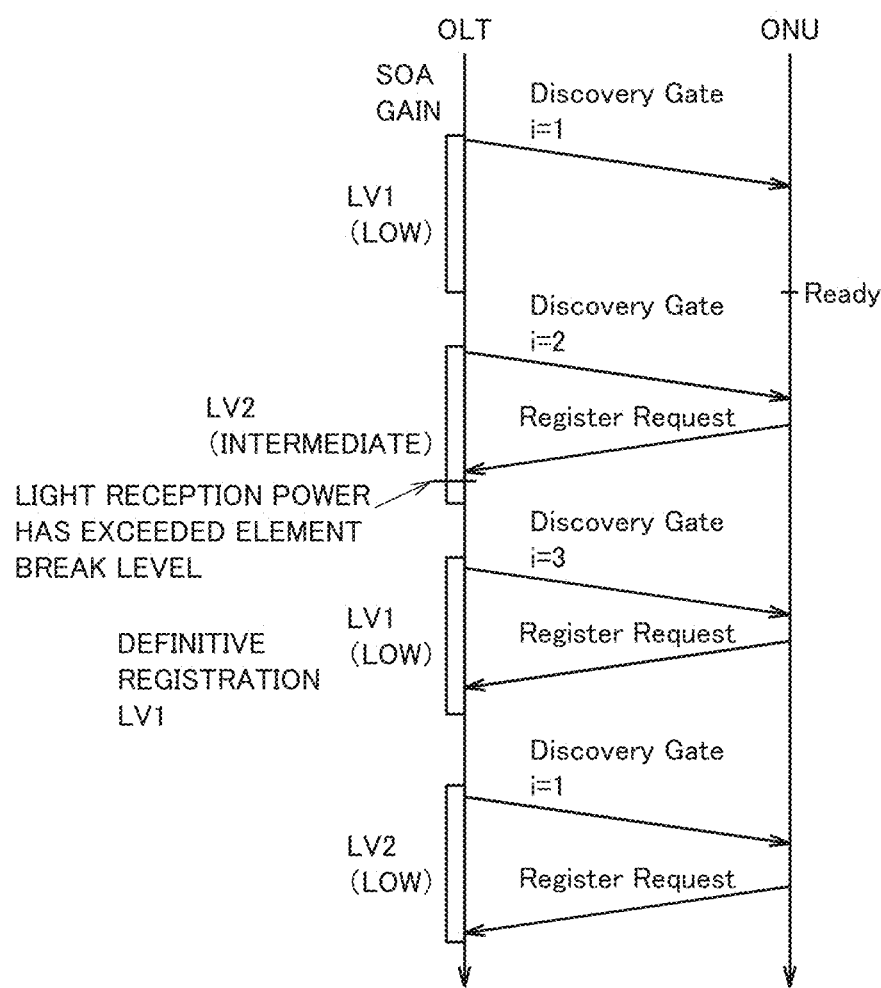
FIG. 32 is a sequence diagram illustrating another example of discovery processing according to the eighth embodiment.

FIG. 32 is a sequence diagram illustrating another example of discovery processing according to the eighth embodiment. As shown in FIG. 32, an unregistered ONU is assumed to be Ready at timing immediately before the level of the SOA gain attains to LV2 (intermediate). The ONU transmits a registration request in response to a discovery gate message. Power of light amplified by the SOA of OLT 100 is assumed to have exceeded the break level of the light receiver. Even light high in power can be prevented from damaging a light reception element so long as a time period of input thereof to a light receiver is very short.

In a normal sequence, OLT 100 then sets the level of the SOA gain to LV3. When strong light enters the light receiver, however, OLT 100 sets the level of the SOA gain to the lowest level (LV1) in this case and sets again the gain. For example, by comparing intensity sensed by the light receiver with a threshold value, OLT 100 can determine whether to switch the level of the SOA gain from LV2 to LV3 or from LV2 to LV1.

The ONU transmits a registration request in response to a discovery gate message. Since power of light input to the light receiver of OLT 100 is at a normal level, OLT 100 can normally obtain the registration request. OLT 100 thus definitively registers LV1 as the SOA gain level for the ONU. Therefore, damage to a light reception element of the light receiver can be prevented.

When intensity of an optical signal received by the light receiver of OLT 100 is excessively low, error in data reading in OLT 100 often occurs. Therefore, in (a synchronous pattern section of) discovery burst, OLT 100 conducts bit error rate (BER) measurement. When the BER of a signal transmitted from the ONU becomes poor to a threshold value (for example, $10^{-4}$ or $10^{-5}$) or greater, OLT 100 determines that setting of the gain is too low for the ONU. In this case, OLT 100 raises the level of the gain (for example, by one level). Then, OLT 100 registers the level. The SOA gain for each ONU can thus properly be set. By registering the set gain in the OLT, communication between OLT 100 and the ONU can be stabilized. Quality of communication can thus be secured.

Ninth Embodiment

Each embodiment described above is on the premise that loss in a light propagation path (optical fiber) is not varied. Under some circumstances, however, loss in a light propagation path may change over time, although OLT 100 and ONU 200 are normal. For example, when contact failure in an optical connector that connects an optical transceiver and an optical fiber to each other occurs or when bending loss of an optical fiber is improved during operation, loss of the light propagation path may change over time.

In particular, when loss in the light propagation path is lessened, power of an optical signal input to OLT 100 increases. Therefore, the light receiver in OLT 100 may be damaged. In this embodiment, the ONU monitors intensity of an optical signal also during normal communication. When intensity of the optical signal exceeds a threshold value, the ONU forcibly stops output therefrom. Damage to the light receiver in OLT 100 can thus be avoided.

Figure 33:
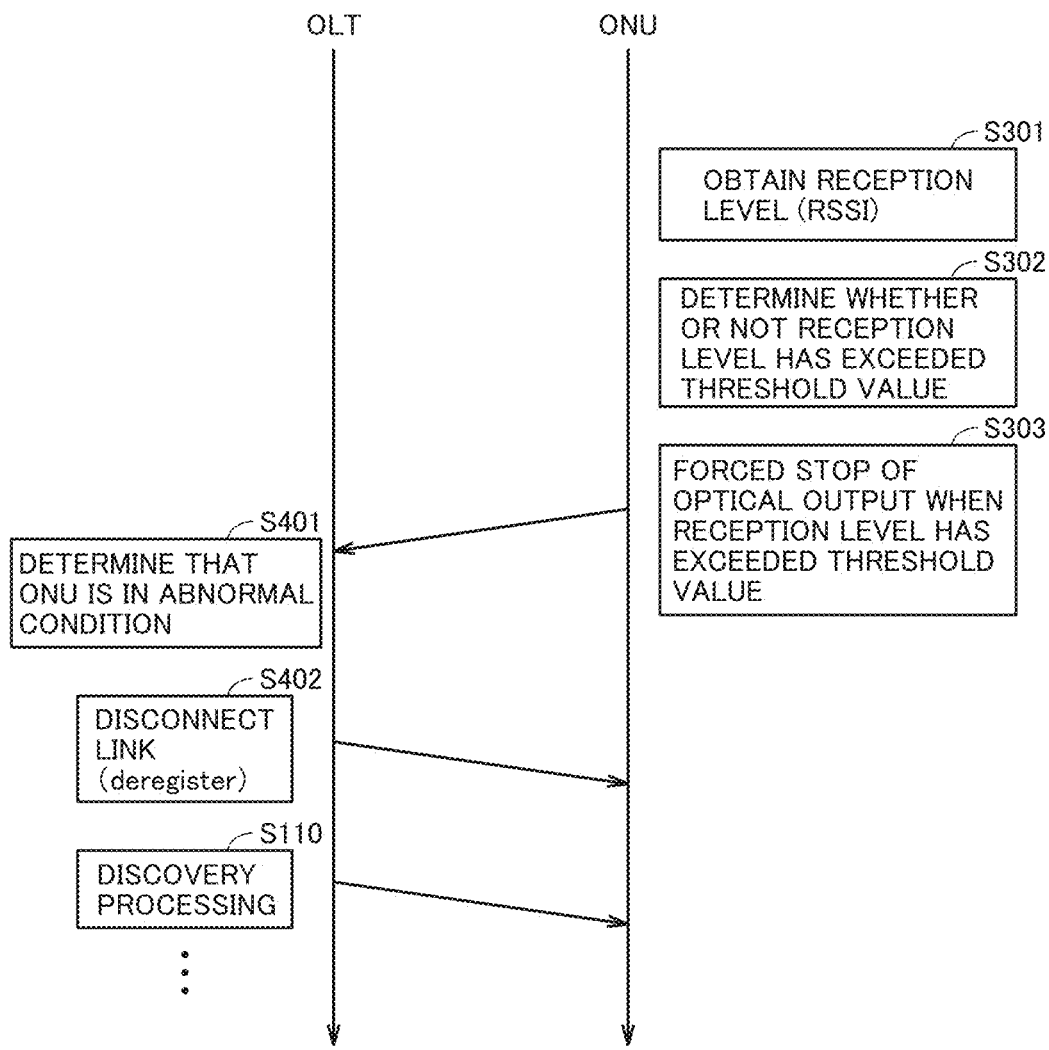
FIG. 33 is a sequence diagram illustrating another example of processing during communication according to a ninth embodiment.

A PON system according to a ninth embodiment may be the same in configuration as shown in FIG. 1. FIG. 33 is a sequence diagram illustrating another example of processing during communication according to the ninth embodiment. Referring to FIG. 33, in step S301, RSSI circuit 241 of ONU 200 obtains the reception level (RSSI) based on an output from the light receiver.

In step S302, ONU 200 (for example, ONU control unit 240) determines whether or not the reception level has exceeded a threshold value set in advance. When the reception level has not exceeded the threshold value set in advance, normal communication is established. When the reception level has exceeded the threshold value set in advance, ONU 200 forcibly stops optical output (step S303).

As ONU 200 stops optical output, OLT 100 determines that ONU 200 is in an abnormal condition (step S401). In this case, OLT 100 performs processing for disconnecting a logical link of ONU 200 (deregister) (step S402).

OLT 100 performs discovery processing, for example, in accordance with the first embodiment (step S110). OLT 100 thus registers again ONU 200. Discovery processing performed by OLT 100 is not limited to discovery processing according to the first embodiment. OLT 100 can perform discovery processing according to any embodiment described above.

As set forth above, according to the ninth embodiment, possibility of reception of an optical signal high in power by OLT 100 with the gain of the SOA on the side of OLT 100 being high can be lowered. Therefore, the light receiver in OLT 100 can be protected.

Tenth Embodiment

Figure 34:
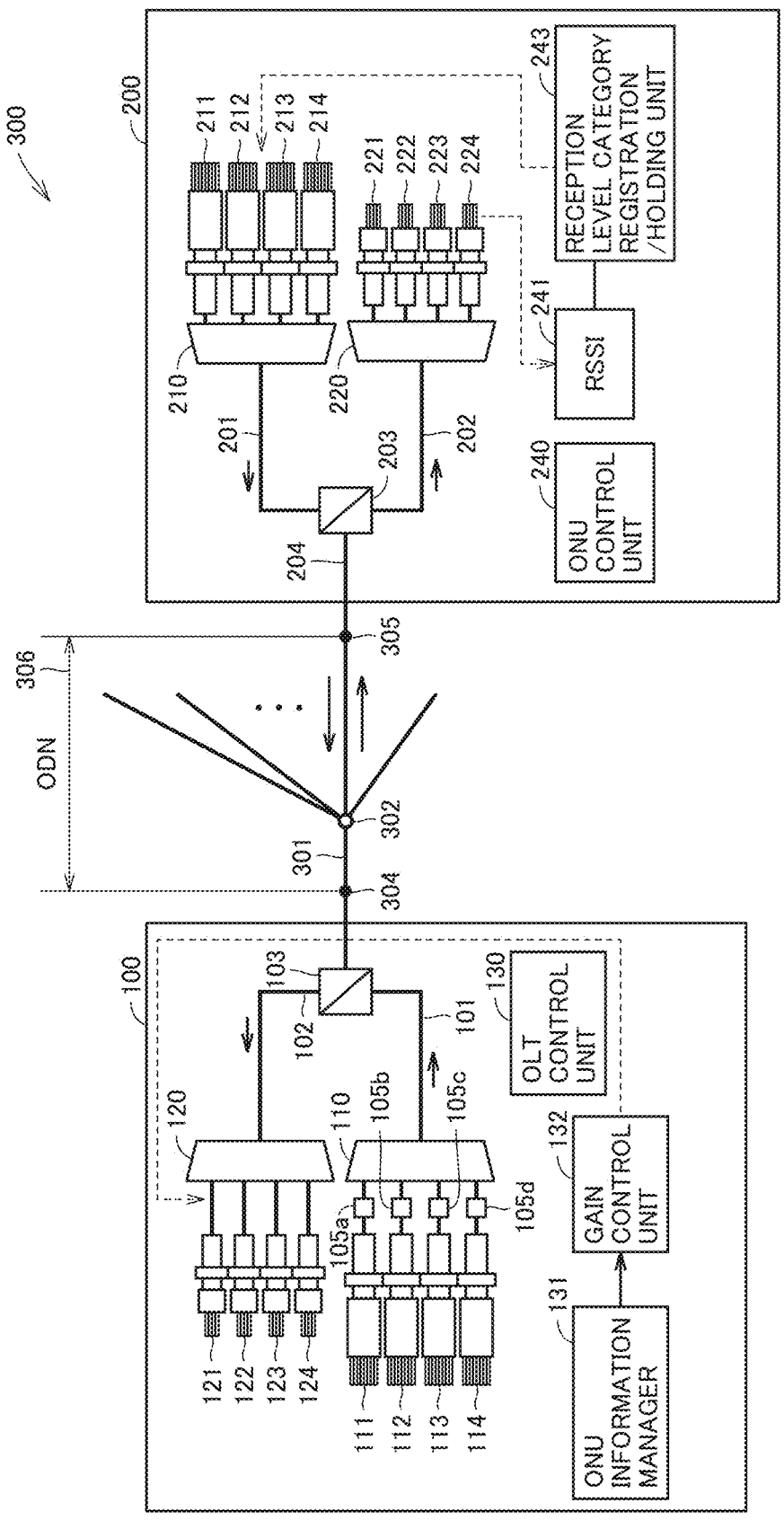
FIG. 34 is a diagram showing an exemplary configuration of the optical communication system according to a tenth embodiment.

In each embodiment described above, OLT 100 amplifies an optical signal from ONU 200 with the SOA. As shown in FIG. 34, however, the SOA on the reception side does not have to be provided in OLT 100. By varying a voltage applied to light receivers 121 to 124, a reception current amplification factor for light receivers 121 to 124 may be varied. OLT 100 can thus control the gain in amplification of an optical signal from an ONU.

It should be understood that the embodiments disclosed herein are illustrative and non-restrictive in every respect. The scope of the present invention is defined by the terms of the claims rather than the embodiments above, and is intended to include any modifications within the scope and meaning equivalent to the terms of the claims.

REFERENCE SIGNS LIST

10 discovery gate message; 11 reception level category; 12 mapping information; 101, 201 light transmission path; 102, 202 light reception path; 103, 203 diplexer filter; 110, 210 optical multiplexer; 111, 114, 211, 214 light transmitter; 120, 220 multiplexer; 121, 122, 123, 124, 221, 222, 223, 224 light receiver; 130 OLT control unit; 131 ONU information manager; 132 gain control unit; 133, 245 transmission power monitoring unit; 204 light propagation path; 240 ONU control unit; 241 RSSI circuit; 243 reception level category registration/holding unit; 244 SOA gain category identification unit; 300 PON system; 301 optical distribution network; 302 optical splitter; 304, 305 definition point; 306 ODN section; S1, S1A, S2, S3, S3A, S11, S12, S13, S14, S20, S31, S32, S33, S34, S40, S51, S52, S53, S54, S81, S82, S83, S84, S85, S86, S87, S88, S91, S92, S93, S110, S111, S112, S113, S120, S121, S122, S123, S130, S131, S140, S150, S151, S152, S160, S161, S162, S163, S164, S170, S171, S172, S201, S202, S203 step.

The invention claimed is:

1. A PON system comprising:
an optical line terminal;
at least one optical network unit; and
an optical fiber that connects the optical line terminal and the optical network unit to each other, wherein
the optical network unit determines a reception level category that categorizes a reception level of an optical signal at the optical network unit, the optical signal being sent from the optical line terminal through the optical fiber, and
the optical line terminal configured to perform discovery processing, the discovery processing including designating the reception level category, searching for an unregistered optical network unit, and registering the unregistered optical network unit corresponding to the reception level category, the unregistered optical network unit configured to respond to the optical line terminal when the reception level designated by the optical line terminal corresponds to the determined reception level category.

2. The PON system according to claim 1, wherein the unregistered optical network unit determines the reception level category based on the reception level.

3. The PON system according to claim 1, wherein the optical line terminal includes an amplifier that amplifies the optical signal received from the optical network unit with a variable gain and designates the reception level category in the discovery processing,
the reception level category is associated with the gain of the amplifier, and
the unregistered optical network unit attempts to respond to the discovery processing in an ascending order of the gain of the amplifier, and the reception level category designated in the discovery processing under which response is successful is set as the reception level category of the unregistered optical network unit.

4. The PON system according to claim 1, wherein the optical line terminal determines the reception level category, and the optical line terminal includes an amplifier that amplifies the optical signal received from the optical network unit with a variable gain,
the reception level category is brought in correspondence with one gain level category or a plurality of gain level categories of the gain, and
when the plurality of gain level categories are allocated to a single reception level category, the unregistered optical network unit attempts to respond to the discovery processing in an ascending order of the plurality of gain level categories.

5. The PON system according to claim 4, wherein the optical line terminal transmits the reception level category determined by the optical line terminal to the optical network unit.

6. The PON system according to claim 4, wherein when the unregistered optical network unit has responded to the discovery processing, the optical line terminal determines whether the unregistered optical network unit can be registered.

7. The PON system according to claim 6, wherein determination by the optical line terminal includes comparison of a frequency of correction in error correction processing with a threshold value.

8. The PON system according to claim 1, wherein the reception level category is determined based on reception power of the optical network unit.

9. The PON system according to claim 1, wherein the reception level category is determined based on line loss of the optical fiber that corresponds to a difference between transmission power of the optical line terminal and reception power of the optical network unit.

10. The PON system according to claim 1, wherein the reception level category is determined based on a maximum value of the reception level of the optical network unit and a minimum value of the reception level of the optical network unit.

11. The PON system according to claim 10, wherein when the optical line terminal performs the discovery processing, the optical line terminal incorporates the maximum value and the minimum value into a discovery gate message.

12. The PON system according to claim 10, wherein at least one of the maximum value and the minimum value is variable.

13. The PON system according to claim 10, wherein the optical line terminal changes the reception level category from a first category to a second category overlapping in range with the first category, and
when the reception level of the optical network unit is included in both of the first category and the second category, the optical network unit responds to the optical line terminal at time when the reception level category higher in reception level, of the first category and the second category, is determined.

14. The PON system according to claim 10, wherein the optical network unit measures the reception level of the optical network unit and determines whether the reception level corresponds to the reception level category based on a measured value of the reception level.

15. The PON system according to claim 10, wherein the reception level category is determined based on line loss of the optical fiber that corresponds to a difference between transmission power of the optical line terminal and reception power of the optical network unit.

16. The PON system according to claim 10, wherein the optical line terminal sets a plurality of times, a set of the maximum value and the minimum value,
a plurality of sets of the maximum value and the minimum value include a first set and a second set that satisfy relation that the maximum value of the second set is larger than the minimum value of the first set, and
the optical line terminal performs the discovery processing for the plurality of sets in a descending order of the maximum value.

17. A PON system comprising:
an optical line terminal;
at least one optical network unit; and
an optical fiber that connects the optical line terminal and the optical network unit to each other,
the optical line terminal including an amplifier that receives an optical signal from the optical network unit and amplifies an output signal with a variable gain, and determining and registering a category of the gain in discovery processing, wherein
in the discovery processing, the optical line terminal sets a reception level category corresponding to the category of the gain of the amplifier,
an unregistered optical network unit attempts to respond to the discovery processing when a reception level of an optical signal at the unregistered optical network unit corresponds to the reception level category, and
when response from the unregistered optical network unit has been acknowledged, the optical line terminal sets the gain category for the unregistered optical network unit.

18. The PON system according to claim 17, wherein the optical line terminal repeatedly makes setting of the gain of the amplifier in the discovery processing and sets the gain category for the optical network unit from which the response has been acknowledged at a gain lower than the registered gain category.

19. The PON system according to claim 17, wherein when intensity of the output signal amplified by the amplifier is higher than a threshold value, the optical line terminal selects the gain category lowest in gain and sets again the gain category.

20. The PON system according to claim 1, wherein the optical network unit monitors the reception level of the optical network unit, and when the reception level exceeds a threshold value, the optical network unit stops optical output, and the optical line terminal determines that the optical network unit is in an abnormal condition based on stop of the optical output from the optical network unit, disconnects a logical link of the optical network unit to the PON system, and registers again the optical network unit by performing the discovery processing.

21. The PON system according to claim 1, wherein
the optical line terminal includes a light receiver that receives an optical signal from the optical network unit and varies an amplification factor in accordance with a voltage applied to the light receiver, and
the optical line terminal varies the voltage applied to the light receiver in accordance with the reception level category.

22. An optical network unit comprising:
a receiver that receives an optical signal;
a registration circuit that registers a reception level category in connection with a level of reception of the optical signal in the receiver; and
a transmitter that transmits, when a reception level category designated in discovery processing for searching for and registering an unregistered optical network unit corresponds to the level of reception registered in the registration circuit, response to the discovery processing in a form of an optical signal.

23. An optical line terminal comprising:
a receiver that receives an optical signal;
an amplifier provided in a stage preceding the receiver, the amplifier amplifying the optical signal with a variable gain;
a transmitter that transmits an optical signal for discovery processing for searching for and registering an unregistered optical network unit,
for checking against a reception level category of the optical network unit, a reception level category associated with the gain of the amplifier being designated in the discovery processing; and
a registration circuit that registers an optical network unit that has responded to the discovery processing.

24. A method of registering an optical network unit in a PON system in which an optical line terminal and at least one optical network unit are connected to each other through an optical fiber, the method comprising:
setting in the optical network unit, a reception level category for categorizing a reception level at the optical network unit, of an optical signal sent from the optical line terminal through the optical fiber;
performing, by the optical line terminal, discovery processing for designating a reception level and searching for and registering an unregistered optical network unit; and
responding, by the unregistered optical network unit, to the discovery processing when the reception level designated by the optical line terminal corresponds to the reception level category set in the unregistered optical network unit; and
registering, by the optical line terminal, an optical network unit that has responded to the discovery processing.

25. The PON system according to claim 17, wherein
the amplifier is a light receiver that receives the optical signal from the optical network unit and varies an amplification factor in accordance with a voltage applied to the light receiver, and
the optical line terminal varies the voltage applied to the light receiver in accordance with the gain category.

26. The PON system according to claim 18, wherein
the amplifier is a light receiver that receives the optical signal from the optical network unit and varies an amplification factor in accordance with a voltage applied to the light receiver, and
the optical line terminal varies the voltage applied to the light receiver in accordance with the gain category.

27. The PON system according to claim 19, wherein
the amplifier is a light receiver that receives the optical signal from the optical network unit and varies an amplification factor in accordance with a voltage applied to the light receiver, and
the optical line terminal varies the voltage applied to the light receiver in accordance with the gain category.

28. The PON system according to claim 20, wherein
the optical line terminal includes a light receiver that receives an optical signal from the optical network unit and varies an amplification factor in accordance with a voltage applied to the light receiver, and
the optical line terminal varies the voltage applied to the light receiver in accordance with the reception level category.

* * * * *